United States Patent
Huang et al.

(10) Patent No.: US 9,450,983 B2
(45) Date of Patent: Sep. 20, 2016

(54) CONTROLLING ACCESS TO AN OPERATOR NETWORK BY NON-CONFORMING DEVICES

(71) Applicant: Verizon Patent and Licensing Inc., Arlington, VA (US)

(72) Inventors: Ye Huang, San Ramon, CA (US); Loc Ba Vo, Pleasant Hill, CA (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 14/325,666

(22) Filed: Jul. 8, 2014

(65) Prior Publication Data

US 2016/0014154 A1    Jan. 14, 2016

(51) Int. Cl.
*H04L 29/06* (2006.01)
*H04W 12/08* (2009.01)

(52) U.S. Cl.
CPC ........... *H04L 63/20* (2013.01); *H04L 63/0227* (2013.01); *H04L 63/102* (2013.01); *H04W 12/08* (2013.01)

(58) Field of Classification Search
CPC ....... H02W 8/22; H04W 8/205; H04W 8/02; H04W 28/16; H04W 12/08; H04L 63/20; H04L 63/0227
See application file for complete search history.

(56) References Cited

U.S. PATENT DOCUMENTS

| | | | | |
|---|---|---|---|---|
| 8,868,745 | B1 * | 10/2014 | Muley ................. | H04L 63/0272 709/223 |
| 2006/0123133 | A1 * | 6/2006 | Hrastar ............... | H04L 63/1408 709/238 |
| 2007/0121596 | A1 * | 5/2007 | Kurapati ........... | H04L 29/06027 370/356 |
| 2007/0143827 | A1 * | 6/2007 | Nicodemus ......... | G06F 21/6218 726/2 |
| 2008/0031212 | A1 * | 2/2008 | Ogura .................. | H04W 28/16 370/338 |
| 2010/0057485 | A1 * | 3/2010 | Luft ........................ | H04W 4/00 455/411 |
| 2011/0314145 | A1 * | 12/2011 | Raleigh ............... | H04L 41/0893 709/224 |
| 2014/0004815 | A1 * | 1/2014 | Shaw .................. | H04L 12/1407 455/405 |
| 2014/0122702 | A1 * | 5/2014 | Jung ................... | H04L 43/0876 709/224 |
| 2014/0133293 | A1 * | 5/2014 | Ismail .................. | H04W 48/06 370/229 |
| 2014/0173712 | A1 * | 6/2014 | Ferdinand ............... | H04L 63/02 726/11 |

OTHER PUBLICATIONS

Gotsis et al, Evolution of Packet Scheduling for Machine-Type Communications of LTE, 2012 IEEE Globecom Workshops, 2012, DOI: 10.1109/GLOCOMW.2012.6477828, pp. 1620-1625.*

Dimatteo et al, Cellular Traffic Offloading through WiFi Networks, 2011 IEEE Eighth International Conference on Mobile Ad-Hoc Sensor System, pp. 192-201, DOI: 10.1109/MASS.2011.26.*

(Continued)

*Primary Examiner* — Roderick Tolentino
*Assistant Examiner* — Harvey Cohen

(57) ABSTRACT

A device is configured to receive an alarm message from a particular device that received a radio resource control request from a client device. The alarm message may indicate that a threshold access limit to an operator network is satisfied by the client device or that a particular protocol is being used by the client device. The device may determine a policy associated with the client device. The policy may indicate a policy rule associated with a policy action to be taken if the policy rule is violated. The device may determine the policy rule is violated based on the alarm message received from the particular device. The device may instruct the particular device to perform the policy action, by accepting or rejecting the radio resource control request, based on the policy rule being violated.

20 Claims, 17 Drawing Sheets

(56) References Cited

OTHER PUBLICATIONS

Hsieh et al, Not Every Bit Counts Data-Centric Resource Allocation for Machine-to-Machine Wireless Networks, Journal ACM Transactions on Sensor Networks (TOSN), vol. 11 Issue 2, Feb. 2015 Article No. 38.*

Schiessl et al, Delay Analysis for Wireless Fading Channels, MSWiM '15 Proceedings of the 18th ACM International Conference on Modeling, Analysis and Simulation of Wireless and Mobile Systems pp. 13-22.*

Wikipedia, "Machine to machine", http://en.wikipedia.org/wiki/Machine_to_machine, Jun. 2, 2014, 8 pages.

* cited by examiner

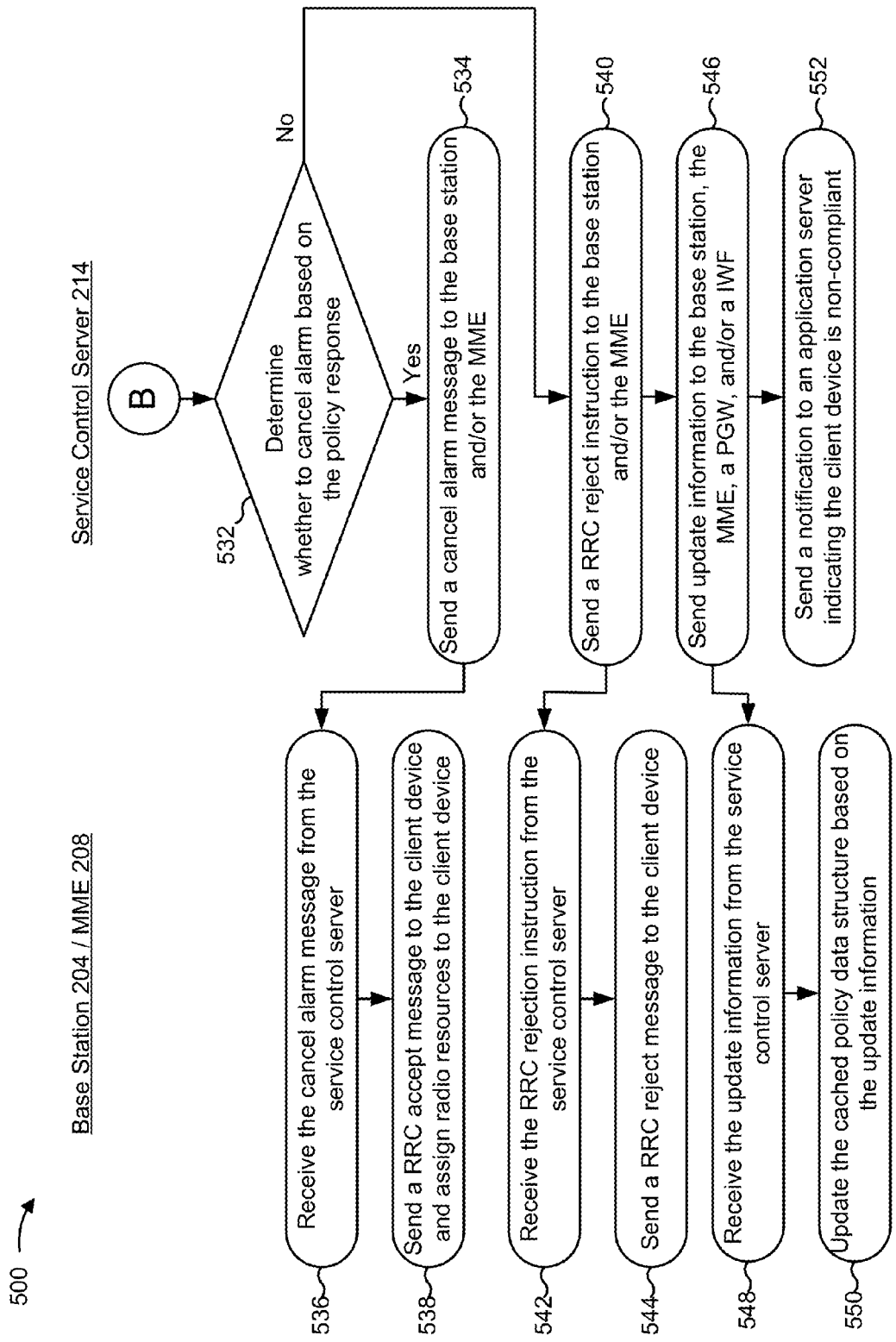

CONTROLLING ACCESS TO AN OPERATOR NETWORK BY NON-CONFORMING DEVICES

BACKGROUND

Machine-to-Machine (M2M) devices are widely used to communicate information via the Internet of Things (IoT). M2M devices may use an operator network (e.g., a wireless network, a mobile network, etc.) to communicate this information.

BRIEF DESCRIPTION OF THE DRAWINGS

FIGS. 5A-5C are flowcharts of an example process relating to the call flow diagrams shown in FIGS. 4A and 4B;

DETAILED DESCRIPTION OF PREFERRED EMBODIMENTS

The following detailed description of example implementations refers to the accompanying drawings. The same reference numbers in different drawings may identify the same or similar elements.

Allowing M2M devices to communicate via an operator network may mean that non-M2M devices (e.g., a user device) have to contend with M2M devices for radio frequency (RF) resources on the operator network. M2M devices may use an exorbitant amount of resources by connecting to the operator network too frequently and/or using certain protocols that utilize RF resources. The end result may be that M2M devices abuse the RF resources and cause a service availability issue for other devices (e.g., a user device operated by a person) that communicate via the operator network.

The operator network may publish guidelines for application developers and/or M2M developers to design M2M applications that utilize RF resources in a permitted way. However, it may be difficult for the operator network to enforce these guidelines. For example, an operator network may have to track which M2M devices are not complying with guidelines after the fact, and work with owners of the M2M devices to resolve the issue.

Implementations described herein may determine whether an M2M device complies with policies for the M2M device and control access of the M2M device to an operator network in real time. Furthermore, implementations described herein may detect violations of the policies due to a message being sent from a M2M device and/or to a M2M device from an application server.

Figure 1:
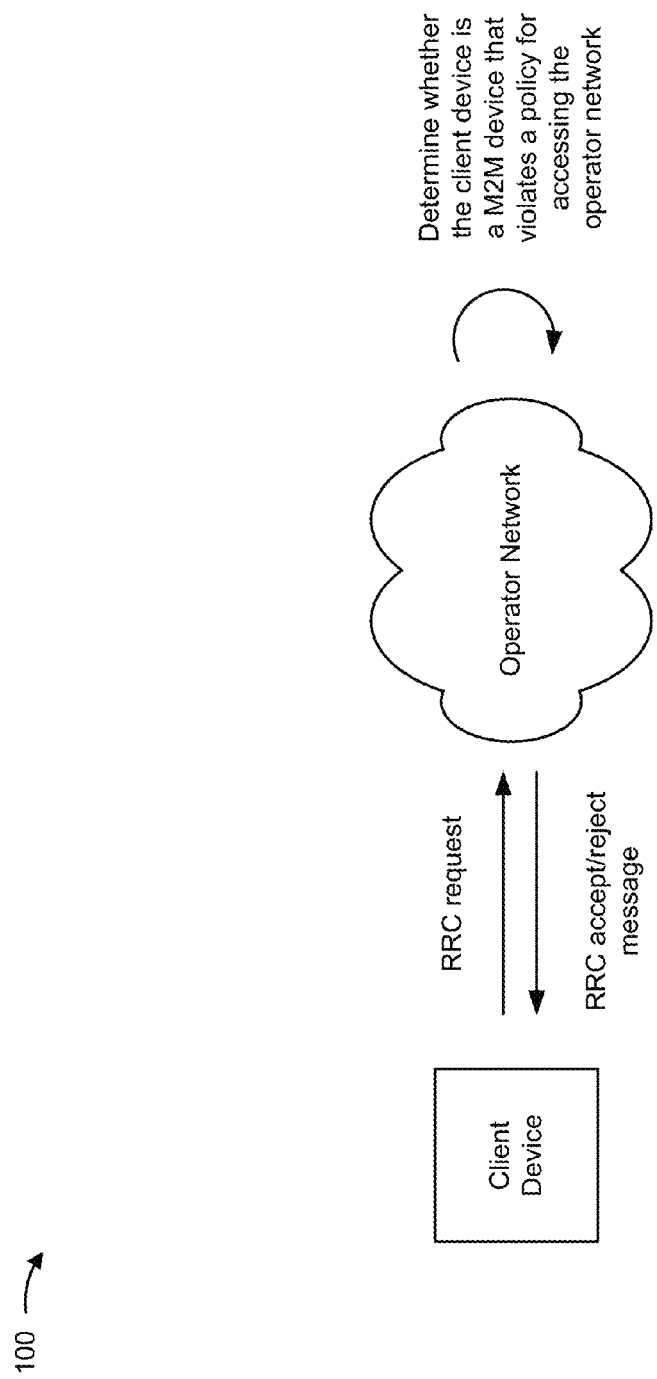
FIG. 1 is a diagram of an overview of an example implementation described herein.

FIG. 1 is a diagram of an overview of an example implementation 100 described herein. As shown in FIG. 1, a client device may send a radio resource control (RRC) request to an operator network. The RRC request may request that radio resources be assigned to the client device so that the client device may use the operator network to communicate (e.g., with a service control server).

The operator network may receive the RRC request and determine whether radio resources should be assigned to the client device. For example, the operator network may determine whether the client device is a M2M device associated with a policy that restricts the M2M device's access to the operator network. For instance, a policy may restrict how often the client device may access the operator network to send and/or receive messages. Additionally, or alternatively, the policy may restrict particular security protocols from being used by the client device.

The operator network may determine in real time whether the client device violates a policy and whether radio resources should be assigned to the client device. For example, a base station, included in the operator network, may store a cached policy data structure that may be used by the base station to determine whether assigning resources to the client device would cause the client device to violate a policy. The operator network may send a RRC accept message (that allows the client device access to the operator network) or a RRC rejection message (that prevents the client device from accessing the operator network) to the client device based on whether radio resources may be assigned to the client device.

In this way, the operator network may control access of the client device to the operator network in real time.

Figure 2:
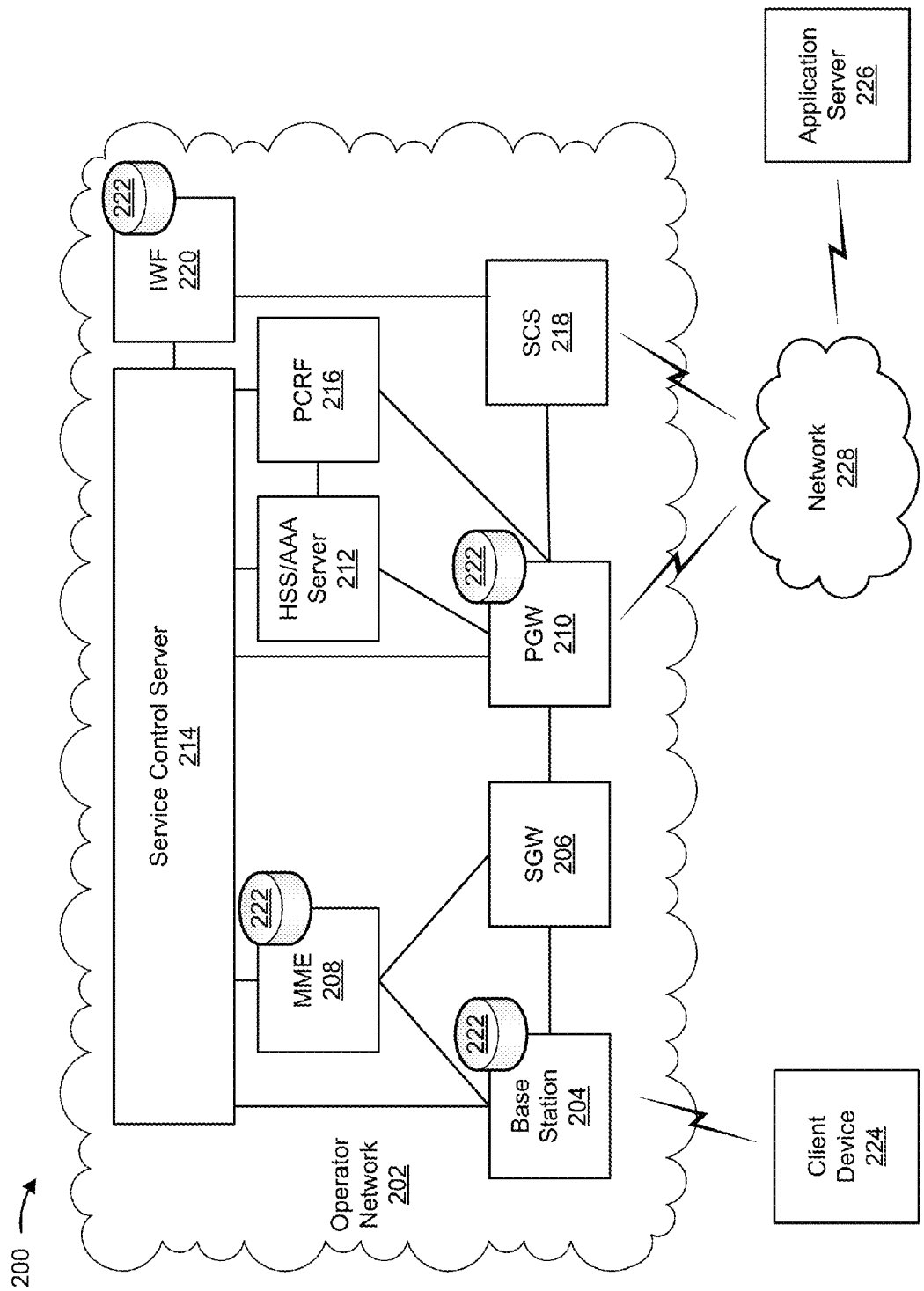
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include an operator network 202. Operator network 202 may include a base station 204, a serving gateway 206 (hereinafter referred to as "SGW 206"), a mobility management entity device 208 (hereinafter referred to as "MME 208"), a packet data network (PDN) gateway 210 (hereinafter referred to as "PGW 210"), a home subscriber server/authentication, authorization, accounting server 212 (hereinafter referred to as "HSS/AAA server 212"), a service control server 214, a policy and charging rules function server 216 (hereinafter referred to as "PCRF 216"), a service capability server 218 (hereinafter referred to as "SCS 218"), an interworking function gateway 220 (hereinafter referred to as "IWF 220"), and/or a cache memory 222. Environment 200 may also include a client device 224, an application server 226, and/or a network 228. Devices of environment 200 may interconnect via wired connections, wireless connections, or a combination of wired and wireless connections.

Operator network 202 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations 204, such as eNodeBs (eNBs), via which client device 224 communicates with the EPC. The EPC may include SGW 206, MME 208, and/or PGW 210 that enables client device 224 to communicate with network 228, HSS/

AAA server 212, and/or PCRF 216 and may manage certain information and services, such as authentication, session initiation, account information, and/or a user profile, associated with client device 224. The LTE network may include multiple base stations 204, and the EPC may include multiple SGWs 206, MMEs 208, and/or PGWs 210. Additionally, or alternatively, operator network 202 may include a cellular network, a public land mobile network (PLMN), a second generation (2G) network, a third generation (3G) network, a fourth generation (4G) network, a fifth generation (5G) network, and/or another network.

Base station 204 may include one or more network devices that receive, process, and/or transmit traffic, such as audio, video, text, and/or other data, destined for and/or received from client device 224. In an example implementation, base station 204 may be an eNB device and may be part of the LTE network. Base station 204 may receive traffic from and/or send traffic to network 228 via SGW 206 and PGW 210. Base station 204 may send traffic to and/or receive traffic from client device 224 via an air interface. One or more of base stations 204 may be associated with a RAN, such as the LTE network. In some implementations, base station 204 may include a cache memory 222 that stores a cached policy data structure.

SGW 206 may include one or more network devices, or other types of computation or communication devices, that gather, process, search, store, and/or provide information in a manner described herein. SGW 206 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 206 may, for example, aggregate traffic received from one or more base stations 204 and may send the aggregated traffic to network 228 via PGW 210. In some implementations, SGW 206 may route and forward data, may act as a mobility anchor for a user plane during inter-base station handovers, and may act as an anchor for mobility between LTE and other 3GPP technologies.

MME 208 may include one or more computation or communication devices that gather, process, search, store, and/or provide information in a manner described herein. For example, MME 208 may perform operations associated with a handoff to and/or from the EPS. MME 208 may perform operations to register client device 224 with the EPS, to handoff client device 224 from the EPS to another network, to handoff client device 224 from the other network to the EPS, and/or to perform other operations. MME 208 may perform policing operations for traffic destined for and/or received from client device 224. In some implementations, MME 208 may include a cache memory 222 that stores a cached policy data structure.

PGW 210 may include one or more network devices that gather, process, search, store, and/or provide information in a manner described herein. PGW 210 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 210 may, for example, provide connectivity of client device 224 to external packet data networks, such as network 228, by being a traffic exit/entry point for client device 224. PGW 210 may perform policy enforcement, packet filtering, charging support, lawful intercept, and packet screening. PGW 210 may also act as an anchor for mobility between 3GPP and non-3GPP technologies. PGW 210 may authenticate client device 224 (e.g., via interaction with HSS/AAA server 212). In some implementations, PGW 210 may include a cache memory 222 that stores a cached policy data structure.

HSS/AAA server 212 may include one or more server devices, or other types of computation or communication devices, that gather, process, search, store, and/or provide information in a manner described herein. For example, HSS/AAA server 212 may manage, update, and/or store, in a memory associated with HSS/AAA server 212, profile information associated with client device 224 that identifies applications and/or services that are permitted for and/or accessible by client device 224, bandwidth or data rate thresholds associated with the applications or services, information associated with a user of client device 224 (e.g., a username, a password, a personal identification number (PIN), etc.), a data plan, rate information, minutes allowed, and/or other information.

Additionally, or alternatively, HSS/AAA server 212 may include a device that performs authentication, authorization, and/or accounting (AAA) operations associated with a communication session with client device 224. With regard to the authentication operation, HSS/AAA server 212 may verify a device's (e.g., client device 224) specific digital identity provided via an identifier (e.g., a password, a digital certificate, a phone number, etc.) associated with the device. With regard to the authorization function, HSS/AAA server 212 may grant or refuse privileges to a device (e.g., client device 224) for accessing specific services (e.g., IP address filtering, address assignment, route assignment, quality of service (QoS), etc.). With regard to the accounting operation, HSS/AAA server 212 may track consumption of network resources (e.g., by client device 224) and may use this information for management, planning, billing, etc.

Service control server 214 may include one or more devices capable of storing, processing, and/or routing information. In some implementations, service control server 214 may include a communication interface that allows service control server 214 to receive information from and/or transmit information to other devices in environment 200. In some implementations, service control server 214 may detect a non-conforming client device 224 and determine an action to manage the non-conforming client device 224.

PCRF 216 may include one or more server devices, or other types of computation or communication devices, that gather, process, search, store, and/or provide information in a manner described herein. For example, PCRF 216 may perform operations that enforce EPS policies associated with a communication session with client device 224. For example, PCRF 216 may dynamically provide real-time bandwidth allocations and/or controls (e.g., associated with a particular access point name (APN)) associated with particular applications, network accesses, and/or services provided to client device 224 during a communication session. PCRF 216 may also dynamically provide a real-time signal flow policy to adapt to changing conditions within the network and/or to manage traffic flow during the communication session.

SCS 218 may include one or more server devices, or other types of computation or communication devices, that gather, process, search, store, and/or provide information in a manner described herein. For example, SCS 218 may enable applications provided by application server 226 to access and use functionality provided by service components of operator network 202 (e.g., bearers defined by QoS parameters and/or other mechanisms for realizing a service) over standardized interfaces (e.g., application programming interfaces (APIs)). SCS 218 may host multiple service components.

IWF 220 may include one or more network devices that gather, process, search, store, and/or provide information in a manner described herein. IWF 220 may include one or more data processing and/or traffic transfer devices, such as a gateway, a router, a modem, a switch, a firewall, a NIC, a hub, a bridge, a proxy server, an OADM, or some other type of device that processes and/or transfers traffic. IWF 220 may, for example, enable network 228 or another network to communicate with the LTE network included in operator network 202. In some implementations, IWF 220 may include a cache memory 222 that stores a cached policy data structure. In some implementations, IWF 220 may map external identifiers of devices to internal network identifiers, such as an international mobile subscriber identity (IMSI), to hide the network internal identifiers from external applications or devices. Additionally, or alternatively, IWF 220 may convert external M2M protocols to proper internal network protocols to enable M2M applications to send trigger and/or control messages to the devices, or to pass user plane data to/from M2M devices. Furthermore, IWF 220 may interrogate HSS/AAA server 212 and/or PCRF 216 for authentications and authorizations, and apply runtime policies and/or charging rules/actions.

Cache memory 222 may be a memory that stores a cached policy data structure which may be updated by service control server 214 and/or another device included in environment 200.

Client device 224 may include a device capable of receiving, processing, and providing information. For example, client device 224 may include a mobile phone (e.g., a smart phone, a radiotelephone, etc.), a computing device (e.g., a laptop computer, a tablet computer, a handheld computer, a gaming device, etc.), a M2M device, or a similar device. In some implementations, client device 224 may include a communication interface that allows client device 224 to receive information from and/or transmit information to another device in environment 200.

Application server 226 may include one or more devices capable of storing, processing, and/or routing information. In some implementations, application server 226 may include a communication interface that allows application server 226 to receive information from and/or transmit information to other devices in environment 200. In some implementations, application server 226 may manage a M2M application for communicating with client device 224 (e.g., an M2M device) via operator network 202.

Network 228 may include one or more wired and/or wireless networks. For example, network 228 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
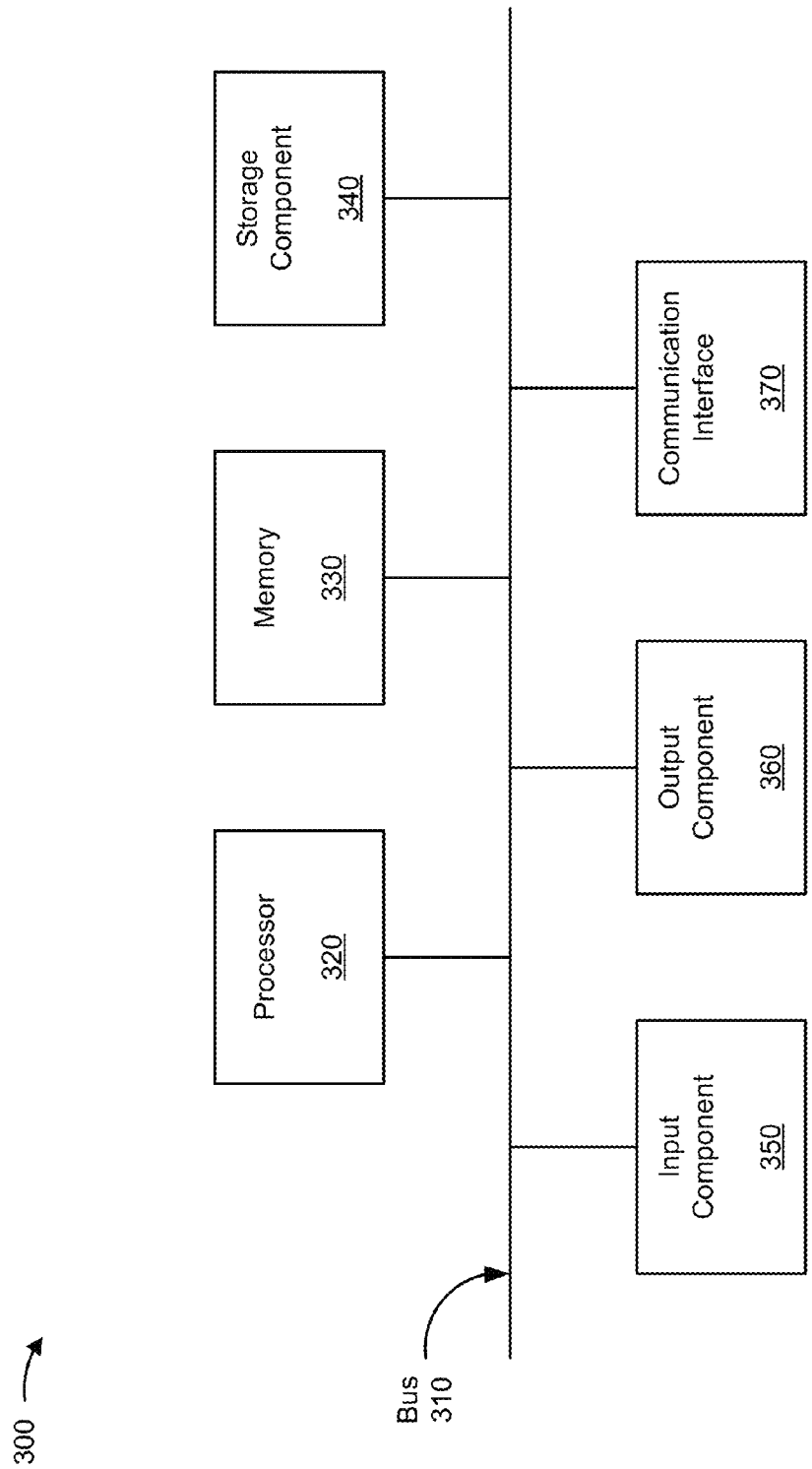
FIG. 3 is a diagram of example components of one or more devices of FIG. 2.

FIG. 3 is a diagram of example components of a device 300. Device 300 may correspond to base station 204, SGW 206, MME 208, PGW 210, HSS/AAA server 212, service control server 214, PCRF 216, SCS 218, IWF 220, cache memory 222, client device 224, and/or application server 226. In some implementations, base station 204, SGW 206, MME 208, PGW 210, HSS/AAA server 212, service control server 214, PCRF 216, SCS 218, IWF 220, cache memory 222, client device 224, and/or application server 226 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
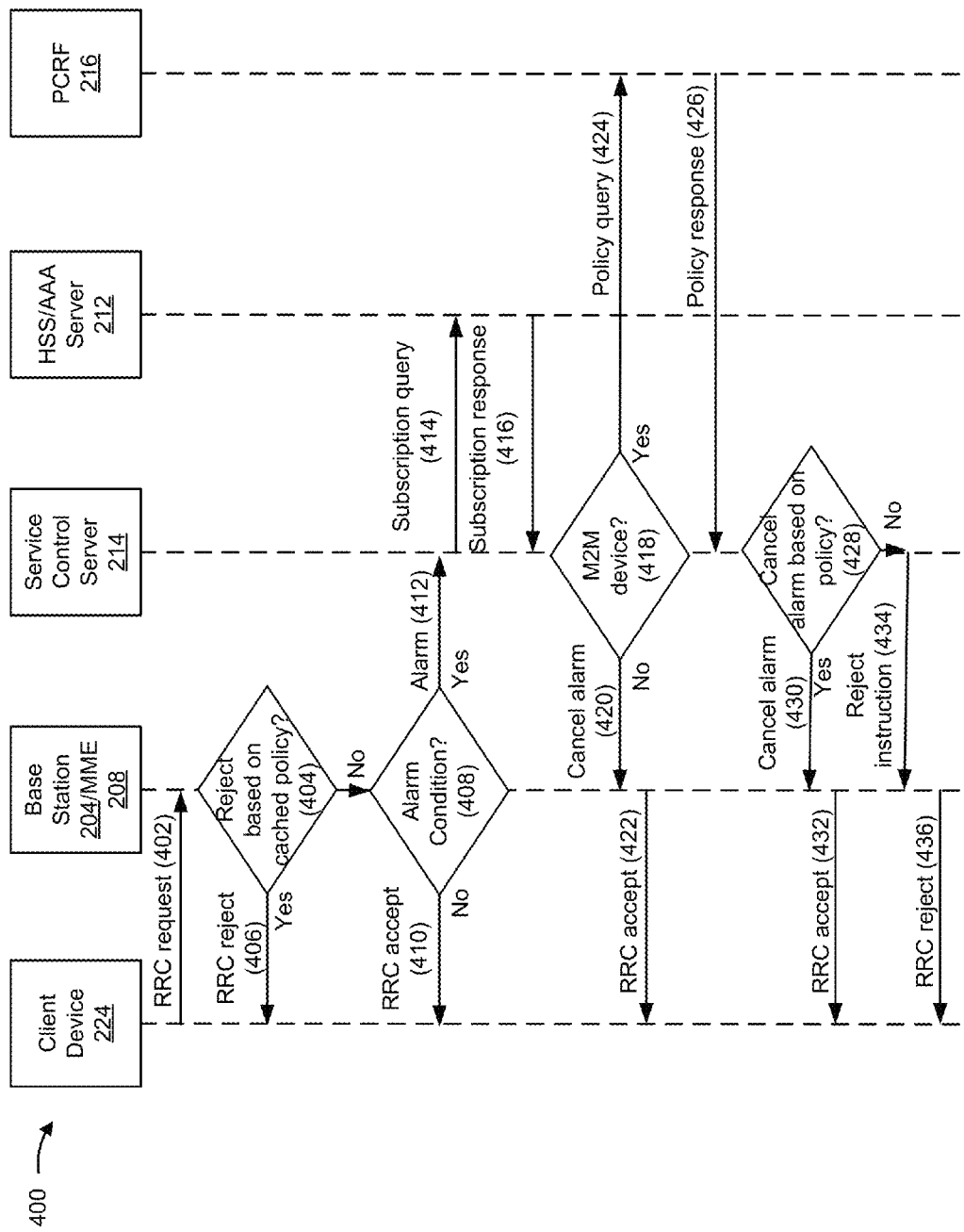
FIGS. 4A and 4B are call flow diagrams of an example process for controlling access of a client device to an operator network.
Figure 4B:
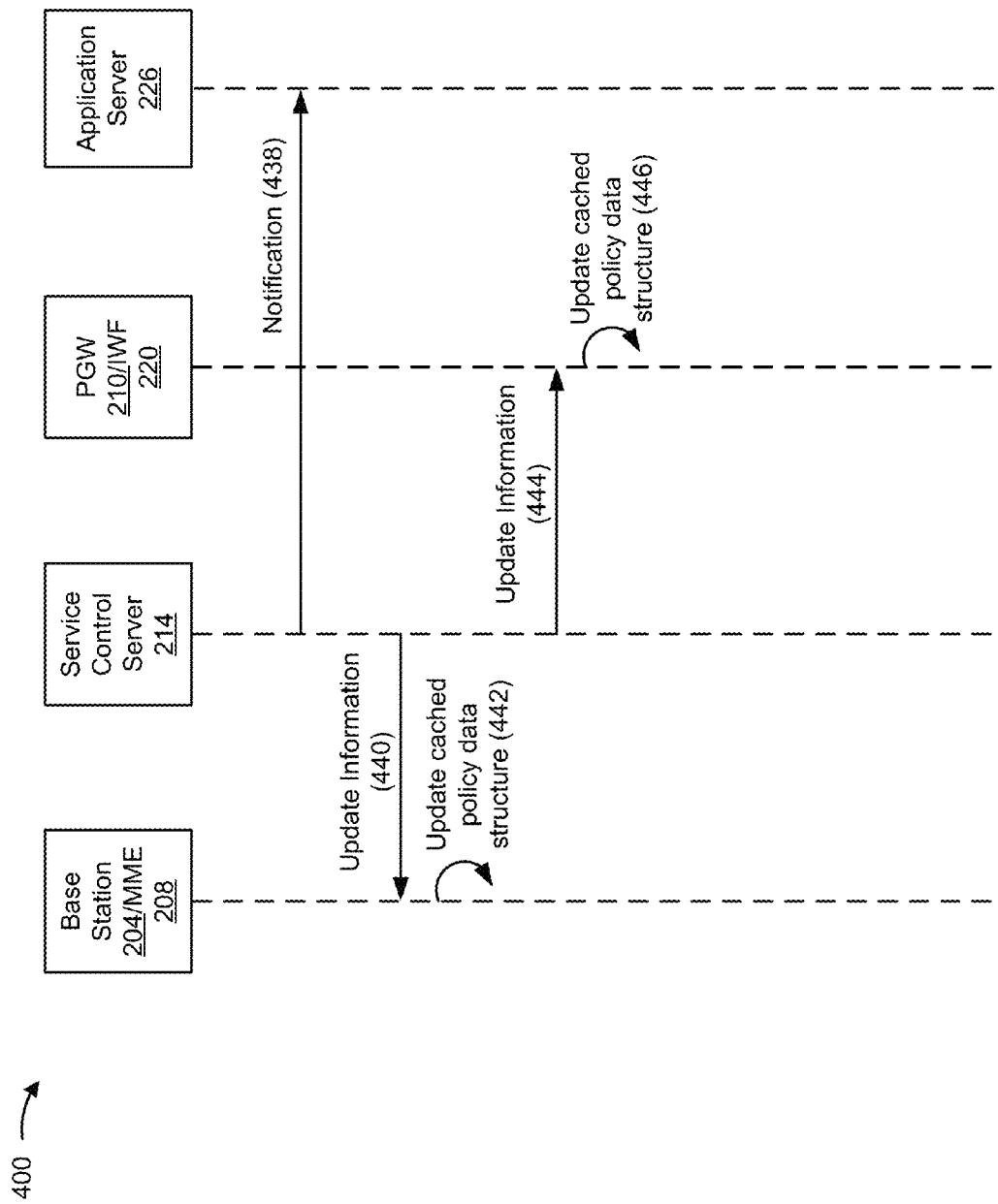

FIGS. 4A and 4B are call flow diagrams of an example process 400 for controlling access of client device 224 to operator network 202. In some implementations, one or more process blocks of FIGS. 4A and 4B may be performed by base station 204, MME 208, PGW 210, HSS/AAA server 212, service control server 214, IWF 220, PCRF 216, client device 224, and/or application server 226. Additionally, or alternatively, one or more process blocks of FIGS. 4A and 4B may be performed by another device or a group of devices separate from or including base station 204, MME 208, PGW 210, HSS/AAA server 212, service control server 214, IWF 220, PCRF 216, client device 224, and/or application server 226, such as SGW 206, SCS 218, and/or cache memory 222.

As shown in FIG. 4A, process 400 may include sending a radio resource control (RRC) request to base station 204 (block 402). For example, client device 224 may send the RRC request to base station 204. In some implementations, the RRC request may request access to radio resources from base station 204 and/or to activate a communication session with operator network 202. The RRC request may indicate a client device identifier that uniquely identifies client device 224 (e.g., a phone number, an IP address, an IMSI, an international mobile station equipment identify (IMEI), a mobile equipment identifier (MEID), etc.).

Base station 204 may receive the RRC request from client device 224 and transmit the RRC request to MME 208. MME 208 may receive the RRC request from base station 204.

As further shown in FIG. 4A, process 400 may include determining whether to reject the RRC request based on a policy stored in a cached policy data structure (block 404). For example, base station 204 and/or MME 208 may determine whether to reject the RRC request based on the stored policy.

In some implementations, base station 204 and/or MME 208 may store a cached policy data structure in cache memory 222. The cached policy data structure may include local policy information that identifies one or more policies and/or may include client device information that identifies policies associated with one or more client devices 224.

The local policy information may associate a policy identifier that uniquely identifies the policy, a policy rule for the policy, and/or a policy action to take for a violation of the policy rule.

In some implementations, the policy rule may identify a threshold access limit that indicates how often any client device 224 may be assigned radio resources from a base station 204 and/or access operator network 202. For example, the threshold access limit may indicate a maximum number of communication sessions (e.g., based on RRC requests from client device 224 and/or based on trigger messages from application server 226 to connect to client device 224) that any client device 224 is permitted per an amount of time. Additionally, or alternatively, the policy rule may restrict a kind of data security protocol (e.g., an Internet Security Protocol (IPsec)) and/or a kind of data transmission. For example, the policy rule may restrict data being sent using transport layer security (TLS), a secure sockets layer (SSL) protocol, a virtual private network (VPN), etc. In some implementations, the policy rule may act as a trigger that triggers a policy action to be taken.

In some implementations, the policy action may include throttling a communication session (e.g., limiting how often client device 224 may be assigned radio resources and/or access operator network 202), releasing a communication session, preventing a new communication session from being established, preventing radio resources from being assigned, and/or taking no action.

For example, the local policy information may indicate a policy that throttles a communication session if the threshold access limit is reached. In other words, if client device 224 is accessing operator network 202 at a rate faster than a permitted threshold access limit (e.g., one access per one minute), the policy may limit subsequent requests to a different rate (e.g. one access per five minutes). On the other hand, the local policy information may indicate that no action should be taken if the threshold access limit is reached.

As another example, the local policy information may indicate another policy that restricts using a SSL protocol. If the policy rule is violated by data being transmitted (or attempted to be transmitted) during a communication using a SSL protocol, then the local policy information may indicate that the communication session should be released or terminated. On the other hand, if the policy rule is violated by data being transmitted using a SSL protocol, the local policy information may indicate that no action should be taken and communication using the SSL protocol should be allowed.

The client device information may associate a client device identifier for client device 224, a policy identifier of a policy for client device 224, a status of a client device 224, and/or an alarm state for client device 224. The status may indicate a current policy action that should be taken for the associated client device 224. The alarm state may indicate whether an alarm has been triggered for client device 224. In some implementations, a RRC request may not be accepted while an alarm is in an active state.

As will be discussed in more detail later, service control server 214 may send update information to base station 204 and/or MME 208 to update the cached policy data structure at particular times. For example, the local policy information may be updated to reflect new or changed policies. Additionally, or alternatively, the client device information may be updated to reflect a new policy identifier associated with client devices 224, a new status associated with client devices 224, and/or a new alarm state (e.g., active or deactive). For example, if any device in operator network 202 detects that client device 224 violated a policy, the status may be updated at other devices in operator network 202 to reflect the current status of client device 224.

In some implementations, base station 204 and/or MME 208 may determine whether the cached policy data structure includes client device information for client device 224 that sent the RRC request based on the client device identifier of client device 224. If the policy data structure does not include client device information for client device 224, then base station 204 and/or MME 208 may determine not to reject the RRC request based on a stored policy (but not necessarily to accept the RRC request).

If the policy data structure includes client device information for client device 224, then base station 204 and/or MME 208 may determine a status of client device 224 based on the client device information. Base station 204 and/or MME 208 may determine whether to reject the RRC request based on the status. For example, if the status indicates the RRC request should be rejected, the communication session should be terminated, and/or the communication session should be throttled, base station 204 and/or MME 208 may determine to reject the RRC request. On the other hand, if the status indicates no action should be taken, then base station 204 and/or MME 208 may determine not to reject the RRC request based on the status (but not necessarily to accept the RRC request).

In some implementations, if the policy data structure includes client device information for client device 224, then base station 204 and/or MME 208 may determine a policy associated with client device 224 based on the client device information and the local policy information. Base station 204 and/or MME 208 may determine whether to reject the RRC request based on whether the RRC request violates the policy. For example, base station 204 and/or MME 208 may detect how many RRC requests have been received from client device 224, at a respective base station 204 and/or at a respective MME 208, in a particular amount of time and/or use deep packet inspection (DPI) to determine a security protocol (e.g., an internet security protocol (IPsec)) to be used to transmit a data packet. For example, base station 204 and/or MME 208 may use DPI to detect an encapsulating security payload (ESP) header and/or an authentication header (AH) included in a data packet to be transmitted from client device 224. If base station 204 and/or MME 208 do not detect that a threshold access limit is exceeded and/or a particular security protocol is to be used, then base station 204 and/or MME 208 may determine not to reject the RRC request based on the policy (but not necessarily to accept the RRC request).

In some implementations, the policy may throttle or prevent new communication sessions if the RRC request will cause client device 224 to exceed the threshold access limit. Thus, if the RRC request exceeds the threshold access limit, base station 204 and/or MME 208 may determine to reject the RRC request in accordance with the policy. It should be noted that a base station 204 may not detect that a RRC request exceeds the threshold access limit but an associated MME 208 may detect that the RRC request exceeds the threshold access limit. Such a situation may occur when client device 224 sends multiple RRC requests to multiple base stations 204 in a particular amount of time, none of which exceed the threshold access rate at any one base station 204. Accordingly, each base station 204 may not detect a violation. However, the multiple RRC requests may go through a same MME 208, which may add together the RRC requests from the multiple base stations 204 to detect the violation.

Additionally, or alternatively, the policy may restrict particular security protocols. Thus, if the RRC request indicates a particular security protocol will be used, base station 204 and/or MME 208 may determine to reject the RRC request in accordance with the policy. On the other hand, the policy may indicate that no action should be taken even if the threshold access limit is exceeded and/or the particular security protocol is used. Thus, base station 204 and/or MME 208 may determine not to reject the RRC based on the policy (but not necessarily to accept the RRC request).

As further shown in FIG. 4A, if base station 204 and/or MME 208 determines that the RRC request should be rejected based on the cached policy data structure (block 404—yes), process 400 may include sending a RRC rejection message to client device 224 (block 406). For example, base station 204 may send the RRC rejection message to client device 224 and/or MME 208 may instruct base station 204 to send the RRC rejection message. The RRC rejection message may be a message that rejects assigning radio resources to client device 224. Client device 224 may receive the RRC rejection message and may be not be permitted to connect to operator network 202.

In some implementations, base station 204 and/or MME 208 may send update information to service control server 214 indicating that client device 224 sent a RRC request and/or that the RRC rejection message was sent to client device 224. Additionally, or alternatively, the update information may indicate a reason why the RRC rejection message was sent to client device 224.

As further shown in FIG. 4A, if base station 204 and/or MME 208 determines that the RRC request should not be rejected based on the cached policy data structure (block 404—no), process 400 may include determining if an alarm condition is satisfied (block 408). For example, base station 204 and/or MME 208 may determine if an alarm condition is satisfied.

In some implementations, base station 204 and/or MME 208 may store alarm information indicating an alarm condition. The alarm condition may identify the threshold access limit and/or a different access limit that indicates how often any client device 224 may be assigned radio resources from a base station 204 and/or access operator network 202. For example, the alarm condition may be satisfied if a rate at which RRC requests are received exceeds the threshold access limit and/or the different access limit. Additionally, or alternatively, the policy rule may restrict a kind of data security and/or a kind of data transmission. For example, the alarm condition may be satisfied by using transport layer security (TLS), a secure sockets layer (SSL) protocol, a virtual private network (VPN), etc.

In some implementations, base station 204 and/or MME 208 may determine if all RRC requests satisfy an alarm condition. In some implementations, base station 204 and/or MME 208 may determine if a RRC request satisfies an alarm condition only when the cached policy data structure does not store a policy for the client device 224 that sent the RRC request. In some implementations, base station 204 and/or MME 208 may determine if a RRC request satisfies an alarm condition only when the RRC request was not rejected based on the cached policy data structure. In some implementations, base station 204 and/or MME 208 may determine if an alarm condition is satisfied before, simultaneously with, or after base station 204 and/or MME 208 determines whether to reject the RRC request based on the cached policy data structure.

As further shown in FIG. 4A, if base station 204 and/or MME 208 determine that the alarm condition is not satisfied (block 408—no), process 400 may include sending a RRC accept message to client device 224 (block 410). For example, base station 204 may send the RRC accept message to client device 224 and/or MME 208 may instruct base station 204 to send the RRC accept message. The RRC accept message may be a message that assigns radio resources to client device 224 and/or acknowledges that radio resources will be assigned to client device 224. Client device 224 may receive the RRC accept message and use the RRC accept message to communicate with operator network 202.

In some implementations, base station 204 and/or MME 208 may send information to service control server 214 indicating that client device 224 sent a RRC request and/or that the RRC accept message was sent to client device 224.

As further shown in FIG. 4A, if base station 204 and/or MME 208 determine that the alarm condition is satisfied (block 408—yes), process 400 may include sending an alarm message to service control server 214 (block 412). For example, base station 204 and/or MME 208 may send the alarm message to service control server 214 based on the alarm condition being satisfied. The alarm message may indicate the alarm condition that was satisfied and the client device identifier for client device 224. For example, the alarm message may indicate a threshold access rate is exceeded and/or a security protocol is being used by client device 224. In some implementations, base station 204 and/or MME 208 may update an alarm state indicated by the client device information to indicate the alarm state is active. While the alarm state is active, base station 204 and/or MME 208 may not permit a RRC accept message to be sent to client device 224.

Service control server 214 may receive the alarm message from base station 204 and/or MME 208.

As further shown in FIG. 4A, process 400 may include sending a subscription query to HSS/AAA server 212 (block 414). For example, service control server 214 may send the subscription query to HSS/AAA server 212 based on receiving the alarm message. The subscription query may include the client device identifier for client device 224 and request device type information about client device 224. The device type information may indicate whether client device 224 is a M2M device.

HSS/AAA server 212 may receive the subscription query from control server 214. HSS/AAA server 212 may store subscription information for client devices 224 registered with operator network 202. HSS/AAA server 212 may query the subscription information using the client device identifier included in the subscription query and obtain device type information for client device 224.

As further shown in FIG. 4A, process 400 may include sending a subscription response to service control server 214 (block 416). For example, HSS/AAA server 212 may send the subscription response to service control server 214. The subscription response may include the obtained device type information and indicate a device type of client device 224.

Service control server 214 may receive the subscription response sent by HSS/AAA server 212.

As further shown in FIG. 4A, process 400 may include determining whether client device 224 is a M2M device based on the subscription response (block 418). For example, service control server 214 may determine whether client device 224 is a M2M device.

In some implementations, service control server 214 may determine client device 224 is a M2M device if the device type information included in the subscription response indicates client device 224 is a M2M device. On the other hand, service control server 214 may determine client device 224 is not a M2M device if the device type information included in the subscription response indicates client device 224 is not a M2M device.

In some implementations, operator network 202 may define which devices are M2M devices. For example, "M2M" may be a device class defined by operator network 202.

As further shown in FIG. 4A, if service control server 214 determines client device 224 is not a M2M device (block 418—no), process 400 may include sending a cancel alarm message to base station 204 and/or MME 208 (block 420). For example, service control server 214 may send the cancel alarm message. The cancel alarm message may indicate to set an alarm state for client device 224 to deactive.

Base station 204 and/or MME 208 may receive the cancel alarm message and set the alarm state to deactive for client device 224.

In some implementations, the cancel alarm message may include M2M information indicating that client device 224 is not a M2M device. Base station 204 and/or MME 208 may store the M2M information indicating client device 224 is not a M2M device. Accordingly, base station 204 and/or MME 208 may not send alarm messages for client device 224 in the future based on client device 224 not being a M2M device.

As further shown in FIG. 4A, process 400 may include sending a RRC accept message to client device 224 (block 422). For example, base station 204 may send the RRC accept message to client device 224 and/or MME 208 may instruct base station 204 to send the RRC accept message. The RRC accept message may be a message that assigns radio resources to client device 224 and/or acknowledges that radio resources will be assigned to client device 224. Client device 224 may receive the RRC accept message and use the RRC accept message to communicate with operator network 202.

As further shown in FIG. 4A, if service control server 214 determines client device 224 is a M2M device (block 418—yes), process 400 may include sending a policy query to PCRF 216 (block 424). For example, service control server 214 may send the policy query to PCRF 216 based on client device 224 being a M2M device. The policy query may include the client device identifier for client device 224 and information indicating an event detected by base station 240. The policy query may further request a policy associated with client device 224.

PCRF 216 may receive the policy query from service control server 214. PCRF 216 may store policy information for client devices 224 registered with operator network 202. PCRF 216 may query the policy information using the client device identifier and/or the information indicating the event included in the subscription query and obtain policy information for client device 224.

As further shown in FIG. 4A, process 400 may include sending a policy response to service control server 214 (block 426). For example, PCRF 216 may send the policy response to service control server 214. The policy response may include the obtained policy information for client device 224 and indicate a policy for client device 224.

Service control server 214 may receive the policy response sent by PCRF 216.

As further shown in FIG. 4A, service control server 214 may determine whether to cancel the alarm based on the policy for client device 224 (block 428). For example, service control server 214 may determine whether to cancel the alarm based on the policy obtained from PCRF 216, a RRC request received by one or more base stations 204, an alarm condition satisfied by client device 224 at one or more base stations 204 and/or MMEs 208, a trigger message received from application server 226 by one or more PGWs 210 and/or IWFs 220, and/or an alarm condition satisfied for client device 224 at one or more PGWs 210 and/or IWFs.

In some implementations, the policy obtained from PCRF 216 may include a policy rule that limits an access rate to a permitted access rate. Accordingly, service control server 214 may determine whether client device 224 complies with the policy based on how many RRC requests have been received from client device 224, at one or more base stations 204 and/or MMEs 208, in a particular amount of time, and/or how many trigger messages have been received from application server 226, by one or more PGWs 210 and/or IWFs 220, in the particular amount of time. For example, service control server 214 may add together all the RRC requests received from client device 224 and all the trigger messages sent to client device 224 to calculate a total number of messages in the particular amount of time. Service control server 214 may determine the total number of messages in the particular amount of time based on alarm messages and/or update information received from base stations 204, MMEs 208, PGWs 210, and/or IWFs 220.

In other words, while each base station 204, MME 208, PGW 210, and/or IWF 220 may determine whether an individual interaction with client device 224 violates a policy for client device 224, service control server 214 may determine whether the cumulative interactions between client device 224 and devices of operator network 202 violate the policy for client device 224.

If the total number of messages in the particular amount of time does not exceed the access limit permitted by the policy for client device 224, then service control server 214 may determine that client device 224 complies with the policy. Accordingly, service control server 214 may determine to cancel the alarm based on the access limit not being exceeded.

On the other hand, if the total number of messages in the particular amount of time exceeds an access limit permitted by a policy for client device 224, then service control server 214 may determine that client device 224 does not comply with the policy. Accordingly, service control server 214 may determine whether to cancel the alarm based on the policy action associated with violating the policy rule (e.g., exceeding the permitted access limit). For example, the policy action may indicate no action should be taken (e.g., the total number of messages in the particular amount of time is permitted). Accordingly, service control server 214 may determine to cancel the alarm. On the other hand, the policy action may indicate to reject the RRC request and/or to throttle the communication session with client device 224. Accordingly, service control server 214 may determine not to cancel the alarm and to reject the RRC request based on the policy action.

In some implementations, the policy information obtained from PCRF 216 may include a policy rule that restricts the use of a particular security protocol. Accordingly, control server 214 may determine whether client device 224 complies with the policy based on whether an alarm message indicates the particular security protocol is being used. If the particular security protocol is not being used, then control server 214 may determine that client device 224 complies with the policy and the alarm should be cancelled.

On the other hand, if the particular security protocol is being used, then control server 214 may determine that client device 224 does not comply with the policy. Accordingly, service control server 214 may determine whether to cancel the alarm based on the policy action associated with violating the policy rule (e.g., using the restricted security protocol). For example, the policy action may indicate no action should be taken (e.g., client device 224 is permitted to use the security protocol). Accordingly, service control server 214 may determine to cancel the alarm. On the other hand, the policy action may indicate to reject the RRC request and/or to throttle the communication session with client device 224. Accordingly, service control server 214 may determine not to cancel the alarm and to reject the RRC request based on the policy action.

As further shown in FIG. 4A, if service control server 214 determines to cancel the alarm (block 428—yes), process 400 may include sending a cancel alarm message to base station 204 and/or MME 208 (block 430). For example, service control server 214 may send the cancel alarm message. The cancel alarm message may indicate to set an alarm state for client device 224 to deactive.

Base station 204 and/or MME 208 may receive the cancel alarm message and set the alarm state to deactive for client device 224.

In some implementations, the cancel alarm message may include policy information indicating the policy for client device 224. Base station 204 and/or MME 208 may use the policy information to update client device information included in the cached policy data structure to indicate the policy for client device 224.

As further shown in FIG. 4A, process 400 may include sending a RRC accept message to client device 224 (block 432). For example, base station 204 may send the RRC accept message to client device 224 and/or MME 208 may instruct base station 204 to send the RRC accept message. The RRC accept message may be a message that assigns radio resources to client device 224 and/or acknowledges that radio resources will be assigned to client device 224. Client device 224 may receive the RRC accept message and use the RRC accept message to communicate with operator network 202.

As further shown in FIG. 4A, if service control server 214 determines not to cancel the alarm (block 428—no), process 400 may include sending a rejection instruction to base station 204 and/or MME 208 (block 434). For example, service control server 214 may send the rejection instruction. The rejection instruction may indicate to reject the RRC request from client device 224 and to maintain the alarm state of client device 224 as active.

In some implementations, the rejection instruction may include policy information indicating the policy for client device 224. Base station 204 and/or MME 208 may use the policy information to update client device information included in the cached policy data structure to indicate the policy for client device 224.

As further shown in FIG. 4A, process 400 may include sending a RRC rejection message to client device 224 (block 436). For example, base station 204 may send the RRC rejection message to client device 224 and/or MME 208 may instruct base station 204 to send the RRC rejection message based on receiving the rejection instruction from service control server 214. The RRC rejection message may be a message that rejects assigning radio resources to client device 224. Client device 224 may receive the RRC rejection message and may be not be permitted to connect to operator network 202.

As shown in FIG. 4B, if service control server 214 determines not to cancel the alarm (block 428—no), process 400 may include sending a notification to application server 226 (block 438). For example, service control server 214 may send a notification to an application server 226 that controls client device 224. The notification may indicate that client device 224 is not complying with a permitted policy. The application server 226 may receive the notification and take action to control client device 224 to comply with the policy. For example, application server 226 may send a control message to client device 224 that instructs client device 224 to reduce RRC requests and/or to use approved security protocols.

As further shown in FIG. 4B, process 400 may include sending update information to base station 204 and/or MME 208 (block 440). For example, service control server 214 may send update information to base station 204 and/or MME 208 to update the cached policy data structure.

For instance, the local policy information may be updated to reflect new or changed policies. Additionally, or alternatively, the client device information may be updated to reflect new or changed polices for client device 224 as indicated by PCRF 216. For example, the update information may indicate a new policy identifier associated with client device 224. Moreover, the client device information may be updated to reflect a new status associated with client device 224 and/or a new alarm state (e.g., active or deactive). For example, if any device in operator network 202 detects that client device 224 violated a policy, the status may be updated at other devices in operator network 202 to reflect the current status of client device 224.

Base station 204 and/or MME 208 may receive the update information sent from service control server 214.

As further shown in FIG. 4B, process 400 may include updating the cached policy data structure (block 442). For example, base station 204 and/or MME 208 may update the cached policy data structure based on the update information. Thus, base station 204 and/or MME 208 may be able to accurately determine to accept or reject a future RRC request (e.g., at blocks 406-410) using the cached policy data structure without service control server 214 having to determine to accept or reject the future RRC request.

As further shown in FIG. 4B, process 400 may include sending update information to PGW 210 and/or IWF 220 (block 444). For example, service control server 214 may send update information to PGW 210 and/or IWF 220 to update the cached policy data structure.

For instance, the local policy information may be updated to reflect new or changed policies. Additionally, or alternatively, the client device information may be updated to reflect new or changed polices for client device 224 as indicated by PCRF 216. For example, the update information may indicate a new policy identifier associated with client device 224. Moreover, the client device information may be updated to reflect a new status associated with client device 224 and/or a new alarm state (e.g., active or deactive). For example, if any device in operator network 202 detects that client device 224 violated a policy, the status may be updated at other devices in operator network 202 to reflect the current status of client device 224.

PGW 210 and/or IWF 220 may receive the update information sent from service control server 214.

As further shown in FIG. 4B, process 400 may include updating the cached policy data structure (block 446). For example, PGW 210 and/or IWF 220 may update the cached policy data structure based on the update information (e.g., generated based on interaction between client device 224 and base station 204/MME 208). Thus, PGW 210 and/or IWF 220 may be able to accurately determine to accept or reject a trigger message from application server 226, as will be discussed in more detail with respect to FIGS. 7A and 7B, using the cached policy data structure without service control server 214 having to determine to accept or reject the trigger message.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
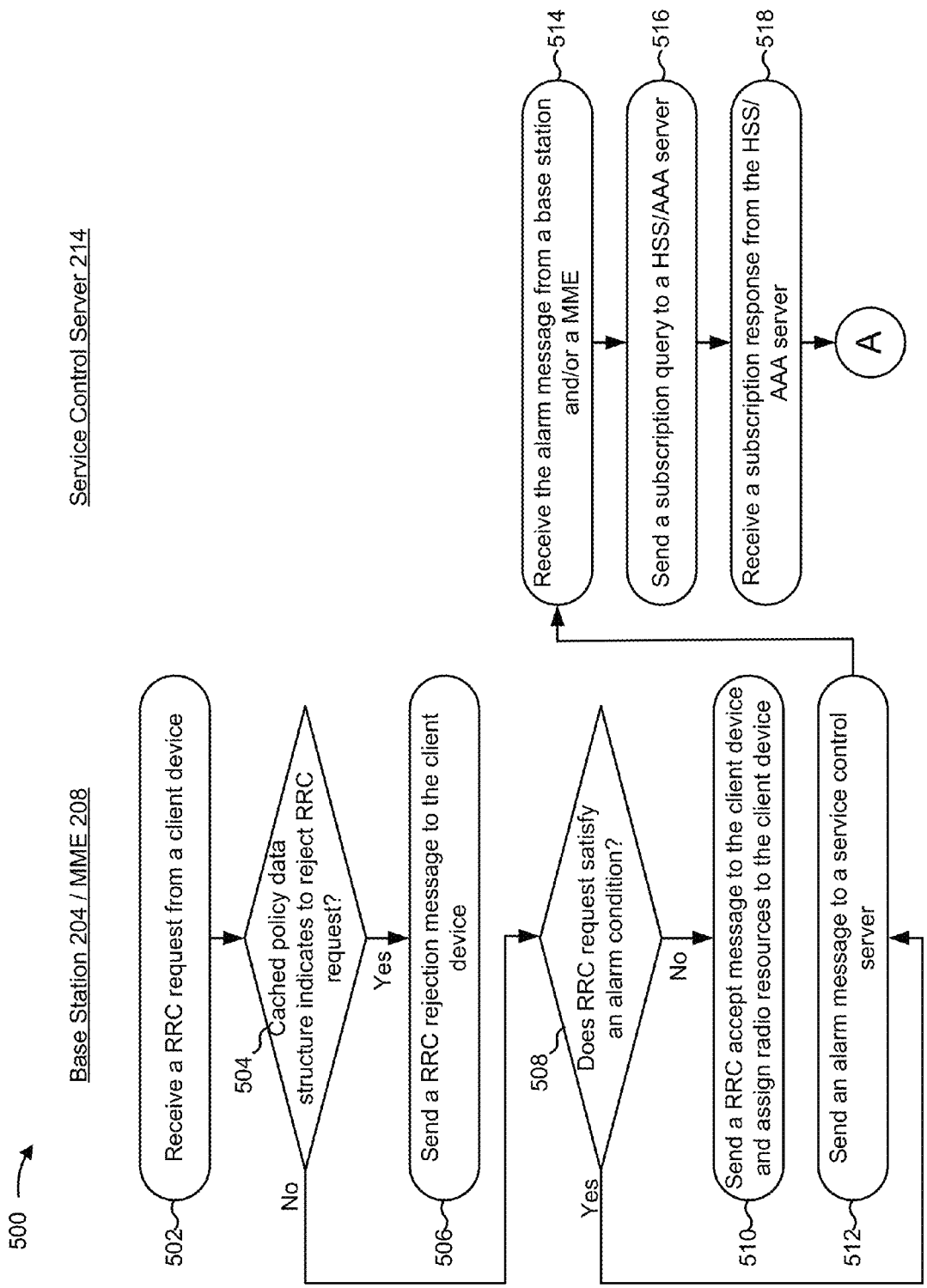
Figure 5B:
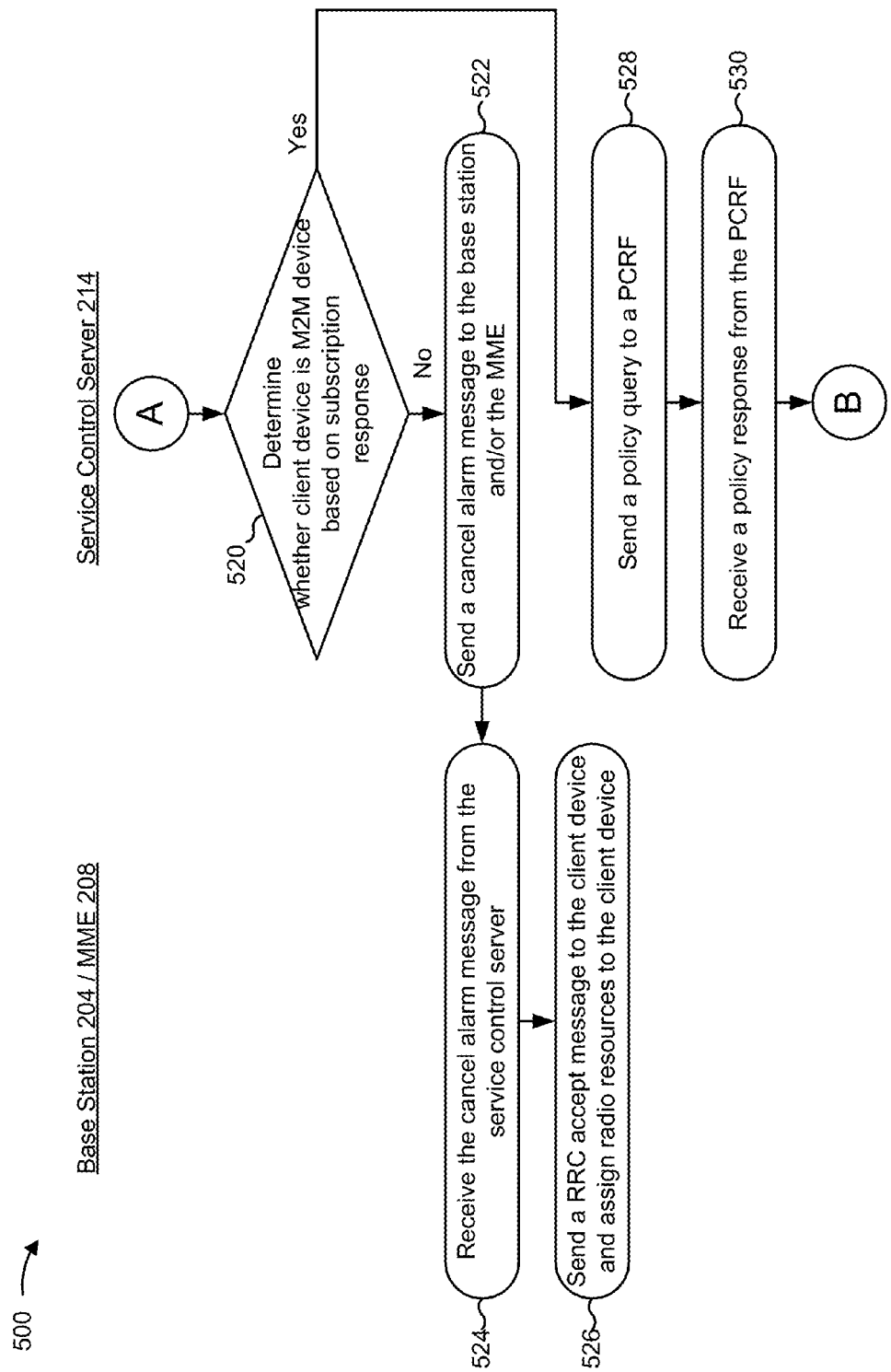

FIGS. 5A-5C are flowcharts of an example process 500 relating to the call flow diagrams shown in FIGS. 4A and 4B. In some implementations, one or more process blocks of FIGS. 5A-5C may be performed by base station 204, MME 208, and/or service control server 214. In some implementations, one or more process blocks of FIGS. 5A-5C may be performed by another device or a group of devices separate from or including base station 204, MME 208, and/or service control server 214, such as PGW 210, HSS/AAA server 212, PCRF 216, SCS 218, IWF 220, cache memory 222, client device 224, and/or application server 226.

As shown in FIG. 5A, process 500 may include receiving a RRC request from client device 224 (block 502). For example, base station 204 and/or MME 208 may receive the RRC request as discussed with respect to block 402 in FIG. 4A.

As further shown in FIG. 5A, process 500 may include determining whether a cached policy data structure indicates to reject the RRC request (block 504). For example, base station 204 and/or MME 208 may determine whether the cached policy data structure indicates to reject the RRC request as discussed with respect to block 404 in FIG. 4A.

As further shown in FIG. 5A, if the cached policy data structure indicates to reject the RRC request (block 504—yes), process 500 may include sending a RRC rejection message to client device 224 (block 506). For example, base station 204 and/or MME 208 may send the RRC rejection message as discussed with respect to block 406 in FIG. 4A.

As further shown in FIG. 5A, if the cached policy data structure indicates not to reject the RRC request (block 504—no), process 500 may include determining whether the RRC request causes client device 224 to satisfy an alarm condition (block 508). For example, base station 204 and/or MME 208 may determine whether the RRC request causes client device 224 to satisfy an alarm condition as discussed with respect to block 408 in FIG. 4A.

As further shown in FIG. 5A, if the RRC request does not cause client device 224 to satisfy an alarm condition (block 508—no), process 500 may include sending a RRC accept message to client device 224 and assign radio resources to client device 224 (block 510). For example, base station 204 and/or MME 208 may send the RRC accept message and assign radio resources as discussed with respect to block 410 in FIG. 4A.

As further shown in FIG. 5A, if the RRC request does cause client device 224 to satisfy an alarm condition (block 508—yes), process 500 may include sending an alarm message to service control server 514 (block 512). For example, base station 204 and/or MME 208 may send the alarm message as discussed with respect to block 412 in FIG. 4A.

As further shown in FIG. 5A, process 500 may include receiving the alarm message from base station 204 and/or MME 208 (block 514). For example, service control server 214 may receive the alarm message as discussed with respect to block 412 in FIG. 4A.

As further shown in FIG. 5A, process 500 may include sending a subscription query to HSS/AAA server 212 (block 516). For example, service control server 214 may send the subscription query as discussed with respect to block 414 in FIG. 4A.

As further shown in FIG. 5A, process 500 may include receiving a subscription response from HSS/AAA server 212 (block 518). For example, service control server 214 may receive the subscription query as discussed with respect to block 416 in FIG. 4A.

As shown in FIG. 5B, process 500 may include determining whether client device 224 is a M2M device based on the subscription response (block 520). For example, service control server 214 may determine whether client device 224 is a M2M device as discussed with respect to block 418 in FIG. 4A.

As further shown in FIG. 5B, if client device 224 is determined not to be a M2M device (block 520—no), process 500 may include sending a cancel alarm message to base station 204 and/or MME 208 (block 522). For example, service control server 214 may send the cancel alarm message as discussed with respect to block 420 in FIG. 4A.

As further shown in FIG. 5B, process 500 may include receiving the cancel alarm message from service control server 214 (block 524). For example, base station 204 and/or MME 208 may receive the cancel alarm message as discussed with respect to block 420 in FIG. 4A.

As further shown in FIG. 5B, process 500 may include sending a RRC accept message to client device 224 and assigning radio resources to client device 224 (block 526). For example, base station 204 and/or MME 208 may send the RRC accept message and assign radio resources as discussed with respect to block 422 in FIG. 4A.

As further shown in FIG. 5B, if client device 224 is determined to be a M2M device (block 520—yes), process 500 may include sending a policy query to PCRF 216 (block 528). For example, service control server 214 may send a policy query as discussed with respect to block 424 in FIG. 4A.

As further shown in FIG. 5B, process 500 may include receiving a policy response from PCRF 216 (block 530). For example, service control server 214 may receive the policy response as discussed with respect to block 426 in FIG. 4A.

As shown in FIG. 5C, process 500 may include determining whether to cancel the alarm based on the policy response (block 532). For example, service control server 214 may determine whether to cancel the alarm based on the policy response as discussed with respect to block 428 in FIG. 4A.

As further shown in FIG. 5C, if the RRC request causes client device 224 to comply with the policy (block 532—yes), process 500 may include sending a cancel alarm message to base station 204 and/or MME 208 (block 534). For example, service control server 214 may send the cancel alarm message as discussed with respect to block 430 in FIG. 4A.

As further shown in FIG. 5C, process 500 may include receiving the cancel alarm message from service control server 214 (block 536). For example, base station 204 and/or MME 208 may receive the cancel alarm message as discussed with respect to block 430 in FIG. 4A.

As further shown in FIG. 5C, process 500 may include sending a RRC accept message to client device 224 and assigning radio resources to client device 224 (block 538). For example, base station 204 and/or MME 208 may send the RRC accept message and assign radio resources as discussed with respect to block 432 in FIG. 4A.

As further shown in FIG. 5C, if the RRC request causes client device 224 to not comply with the policy (block 532—no), process 500 may include sending a RRC rejection instruction to base station 204 and/or MME 208 (block 540). For example, service control server 214 may send the RRC rejection instruction as discussed with respect to block 434 in FIG. 4A.

As further shown in FIG. 5C, process 500 may include receiving the RRC rejection instruction from service control server 214 (block 542). For example, base station 204 and/or MME 208 may receive the RRC rejection instruction as discussed with respect to block 434 in FIG. 4A.

As further shown in FIG. 5C, process 500 may include sending a RRC reject message to client device 224 (block 544). For example, base station 204 and/or MME 208 may send the RRC reject message as discussed with respect to block 436 in FIG. 4A.

As further shown in FIG. 5C, process 500 may include sending update information to base station 204, MME 208, PGW 210, and/or IWF 220 (block 546). For example, service control server 214 may send update information as discussed with respect to blocks 440 and 444 in FIG. 4B.

As further shown in FIG. 5C, process 500 may include receiving the update information from service control server 214 (block 548). For example, base station 204 and/or MME 208 may receive the update information as discussed with respect to block 440 in FIG. 4B.

As further shown in FIG. 5C, process 500 may include updating the cached policy data structure based on the update information (block 550). For example, base station 204 and/or MME 208 may update the cached policy data structure as discussed with respect to block 442 in FIG. 4B.

As further shown in FIG. 5C, process 500 may include sending a notification to application server 226 indicating that client device 224 is non-compliant (block 552). For example, service control server 214 may send the notification as discussed with respect to block 438 in FIG. 4B.

Although FIGS. 5A-5C show example blocks of process 500, in some implementations, process 500 may include additional blocks, fewer blocks, different blocks, or differently arranged blocks than those depicted in FIGS. 5A-5C. Additionally, or alternatively, two or more of the blocks of process 500 may be performed in parallel.

Figure 6A:
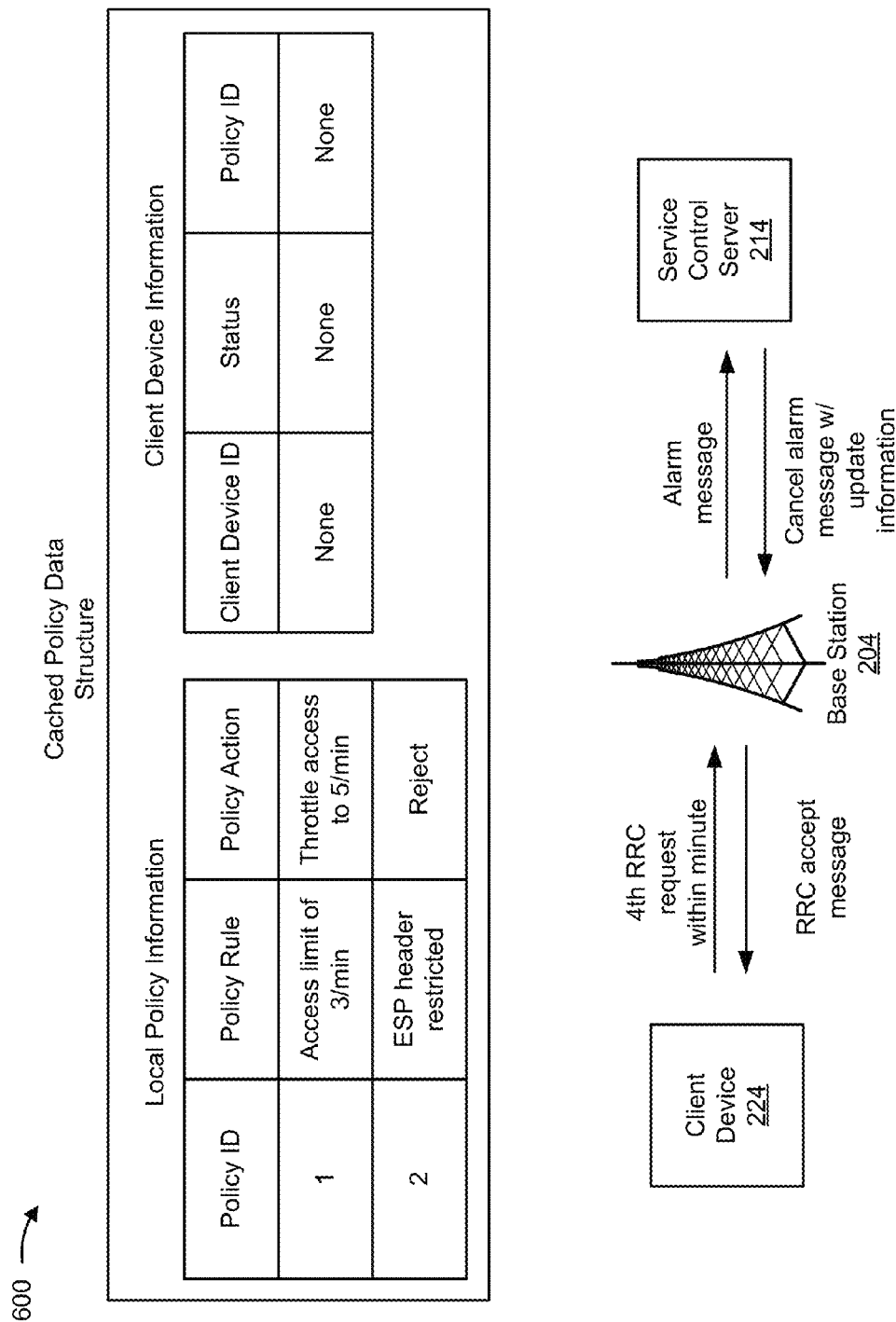
FIGS. 6A and 6B are diagrams of an example implementation relating to the example processes shown in FIGS. 4A-5C.
Figure 6B:
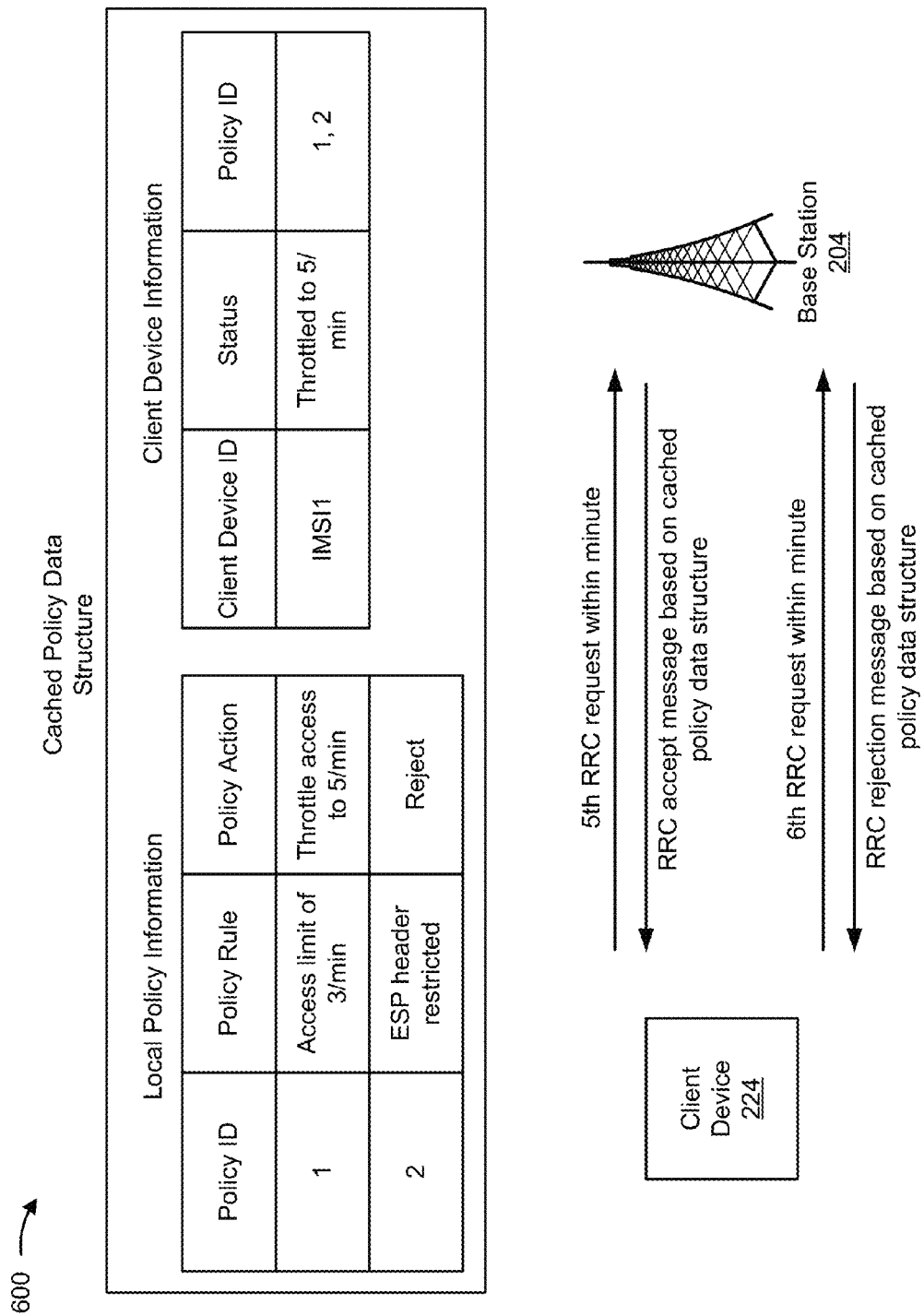

FIGS. 6A and 6B are diagrams of an example implementation 600 relating to example processes 400 and 500 shown in FIGS. 4A-5C. FIGS. 6A and 6B show an example of controlling access of client device 224 to operator network 202.

In example implementation 600, assume base station 204 stores, in cache memory 222, a cached policy data structure as illustrated in FIG. 6A. For example, the cached policy data structure may include local policy information and client device information. Assume the local policy information indicates a first policy, having a policy identifier 1, which throttles access to operator network 202 to five accesses per minute when a threshold access limit of three accesses per minute is exceeded. Further, assume the local policy information indicates a second policy, having a policy identifier 2, which rejects a message having an ESP header.

Further, assume the client device information does not include any information at this time. In other words, assume the cached policy data structure does not indicate a policy for client device 224.

Also, assume base station 204 stores alarm information indicating an alarm condition that is satisfied when more than three access requests are received from client device 224 and/or a data packet includes an ESP header.

As shown in FIG. 6A, assume that client device 224 sends a fourth RRC request to base station 204 within a minute. Assume base station 204 sent RRC accept messages to client device 224 in response to a first three RRC requests in the minute because the first three RRC requests did not violate a policy indicated by the cached policy data structure or trigger an alarm.

Base station 204 may receive the fourth RRC request and determine that the fourth RRC request triggers an alarm based on violating an alarm condition. Base station 204 may send an alarm message to service control server 214. The alarm message may indicate a client device identifier (e.g., IMSI1) for client device 224 and indicate that client device 224 sent four RRC requests within a minute.

Service control server 214 may receive the alarm message and obtain policy information for client device 224 based on the client device identifier. Assume the policy information indicates that policy 1 and policy 2 are associated with client device 224. Accordingly, service control server 214 may determine that client device 224 is permitted five accesses per minute and that client device 224 is complying with policy 1. Service control server 214 may send a cancel alarm message and update information to base station 204.

Base station 204 may receive the cancel alarm message and the update information. Base station 204 may cancel the alarm and send a RRC accept message to client device 224. Furthermore, base station 204 may update the client device information included in the cached policy data structure based on the update information.

As shown in FIG. 6B, base station 204 may update the client device information to include an entry for client device 224 having IMSI1. The client device information may associate policy 1 and policy 2 with client device 224 and indicate that a status for client device 224 is that accesses should be throttled to five per minute.

As further shown in FIG. 6B, assume that client device 224 sends a fifth RRC request within the minute to base station 204. Base station 204 may receive the fifth RRC request and determine client device 224 is complying with policy 1 based on the cached policy data structure. Accordingly, base station 204 may send a RRC accept message to client device 224 without consulting service control server 214.

As further shown in FIG. 6B, assume that client device 224 sends a sixth RRC request within the minute to base station 204. Base station 204 may receive the sixth RRC request and determine the sixth RRC request causes client device 224 to violate policy 1 based on the cached policy data structure. Accordingly, base station 204 may send a RRC rejection message to client device 224 without consulting service control server 214. Additionally, or alternatively, base station 204 may send update information to service control server 214 indicating that client device 224 violated policy 1 so that service control server 214 may update cached policy data structures within other devices included in operator network 202.

In this way, client device 224's access to operator network 202 may be controlled based on policies associated with client device 224.

As indicated above, FIGS. 6A and 6B are provided merely as an example. Other examples are possible and may differ from what was described with regard to FIGS. 6A and 6B.

Figure 7A:
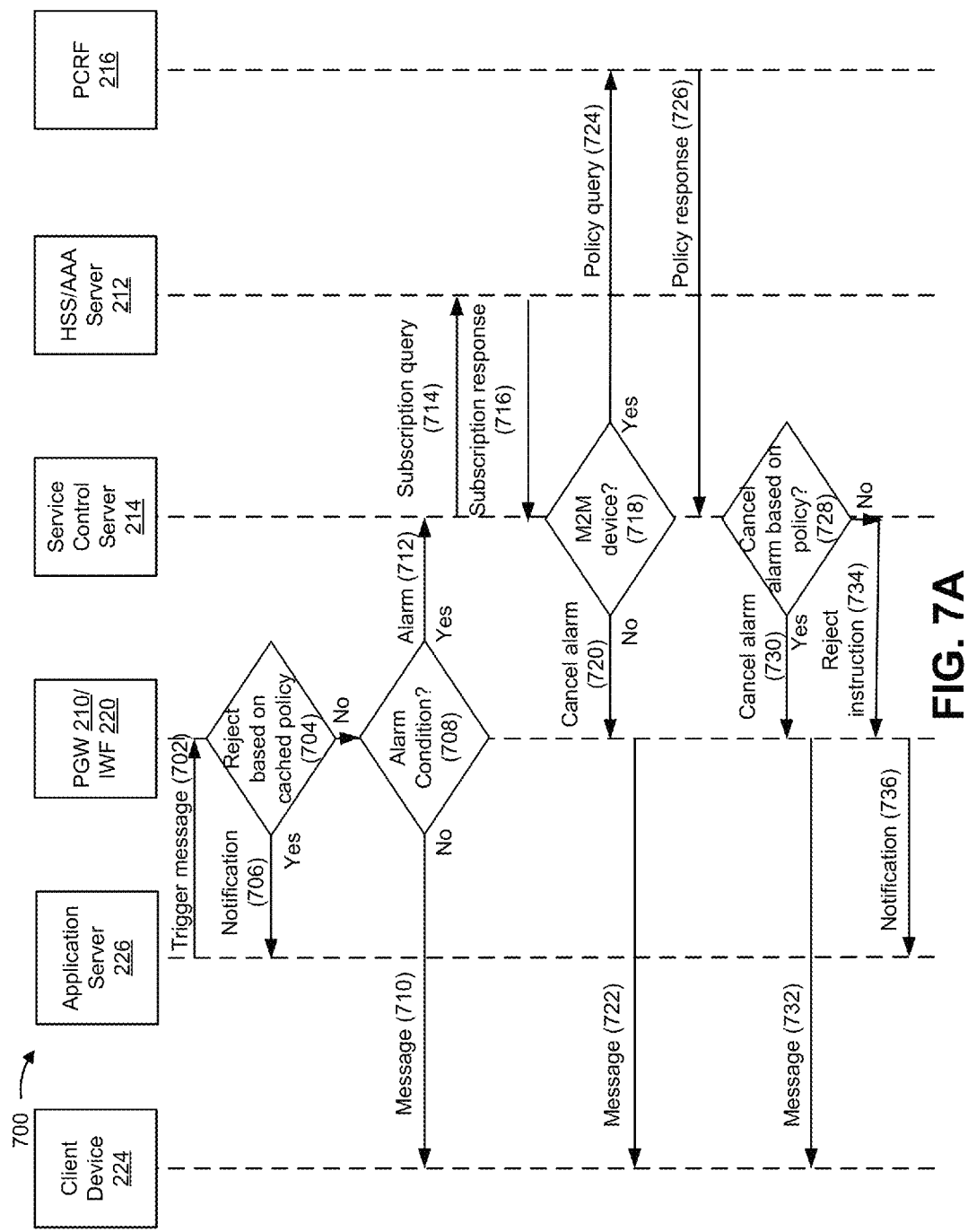
FIGS. 7A and 7B are call flow diagrams of an example process for controlling access of an application server to a client device via an operator network.
Figure 7B:
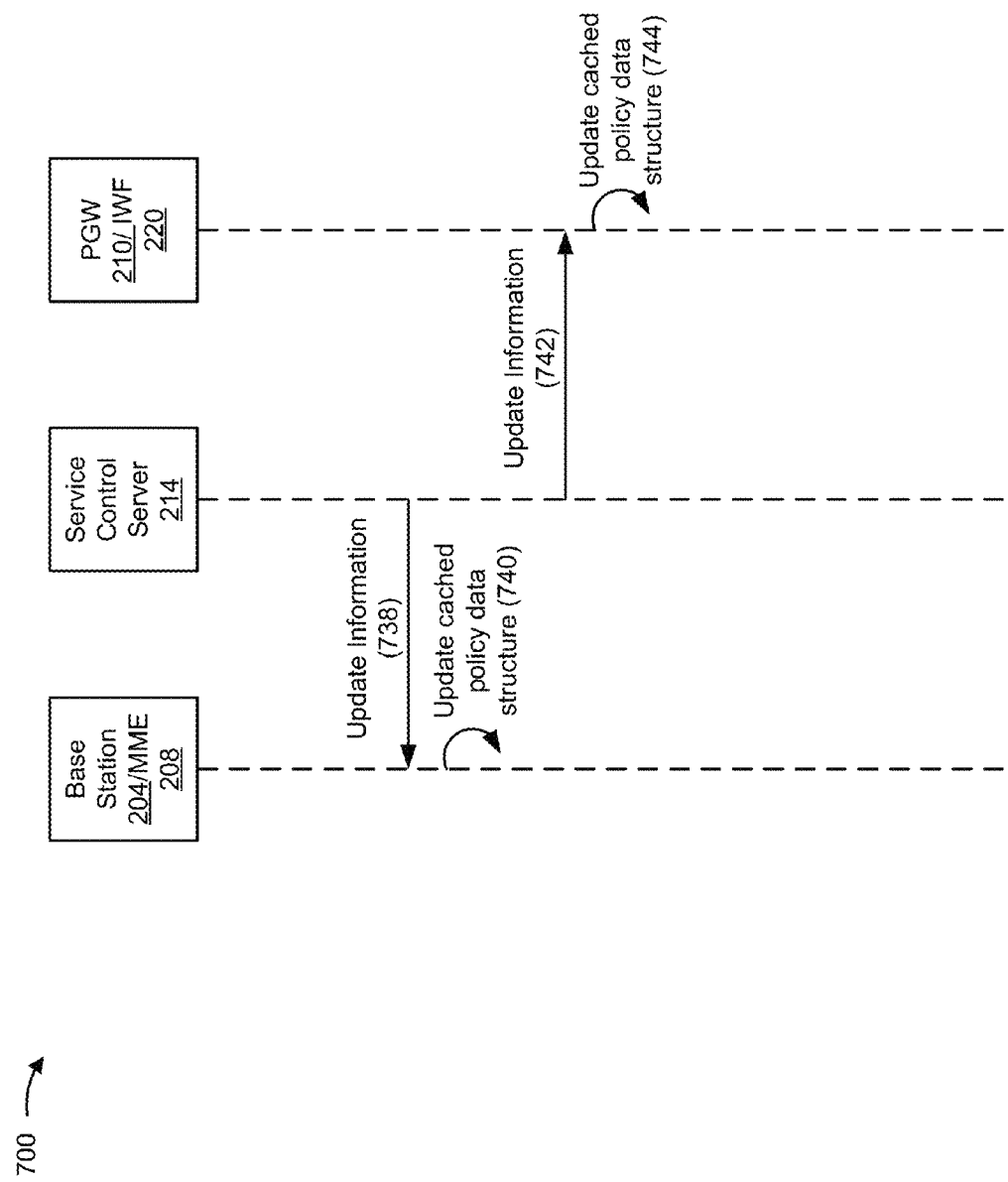

FIGS. 7A and 7B are call flow diagrams of an example process 700 for controlling access of application server 226 to client device 224 via operator network 202. In some implementations, one or more process blocks of FIGS. 7A and 7B may be performed by base station 204, MME 208, PGW 210, HSS/AAA server 212, service control server 214, IWF 220, PCRF 216, client device 224, and/or application server 226. Additionally, or alternatively, one or more process blocks of FIGS. 7A and 7B may be performed by another device or a group of devices separate from or including base station 204, MME 208, PGW 210, HSS/AAA server 212, service control server 214, IWF 220, PCRF 216, client device 224, and/or application server 226, such as SGW 206, SCS 218, and/or cache memory 222.

As shown in FIG. 7A, process 700 may include sending a trigger message to PGW 210 and/or IWF 220 (block 702). For example, application server 226 may send a trigger message to client device 224 via PGW 210 and/or IWF 220. In some implementations, the trigger message may be used to send information to client device 224 and/or request information from client device 224, and may cause operator network 202 to assign radio resources to client device 224 for communication. The trigger message may indicate a client device identifier that uniquely identifies client device 224 (e.g., a phone number, an IP address, an IMSI, an IMEI, a MEID, etc.).

PGW 210 may receive the trigger message from application server 226. Additionally, or alternatively, IWF 220 may receive the trigger message from application server 226 via SCS 218.

As further shown in FIG. 7A, process 700 may include determining whether to reject the trigger message based on a policy stored in a cached policy data structure (block 704). For example, PGW 210 and/or IWF 220 may determine whether to reject the trigger message based on the stored policy.

In some implementations, PGW 210 and/or IWF 220 may store a cached policy data structure in cache memory 222. The cached policy data structure may include local policy information that identifies one or more policies and/or may include client device information that identifies policies associated with one or more client devices 224.

The local policy information may associate a policy identifier that uniquely identifies the policy, a policy rule for the policy, and/or a policy action to take for a violation of the policy rule.

In some implementations, the policy rule may identify a threshold access limit that indicates how often any client device 224 may be assigned radio resources from a base station 204 and/or access operator network 202. For example, the threshold access limit may indicate a minimum number of communication sessions (e.g., based on RRC connection requests from client device 224 and/or based on a trigger message from application server 226 to connect to client device 224) that any client device 224 is permitted per an amount of time. Additionally, or alternatively, the policy rule may restrict a kind of data security and/or a kind of data transmission. For example, the policy rule may restrict data being sent using TLS, a SSL protocol, a VPN, etc. In some implementations, the policy rule may act as a trigger that triggers a policy action to be enforced.

In some implementations, the policy action may include throttling a communication session (e.g., limiting how often client device 224 may be assigned radio resources and/or access operator network 202), releasing a communication session, preventing a new communication session from being established, preventing radio resources from being assigned, and/or taking no action.

For example, the local policy information may indicate a policy that throttles a communication session if the threshold access limit is reached. In other words, if client device 224 is accessing operator network 202 at a rate faster than a permitted threshold access limit (e.g., one access per one minute), the policy may limit subsequent requests to a different rate (e.g. one access per five minutes). On the other hand, the local policy information may indicate that no action should be taken if the threshold access limit is reached.

As another example, the local policy information may indicate another policy that restricts using a SSL protocol. If the policy rule is violated by data being transmitted (or attempted to be transmitted) during a communication using a SSL protocol, then the local policy information may indicate that the communication session should be released or terminated. On the other hand, if the policy rule is violated by data being transmitted using a SSL protocol, the local policy information may indicate that no action should be taken and communication using the SSL protocol should be allowed.

The client device information may associate a client device identifier for client device 224, a policy identifier of a policy for client device 224, a status of a client device 224, and/or an alarm state for client device 224. The status may indicate a current policy action that should be taken for the associated client device 224. The alarm state may indicate whether an alarm has been triggered for client device 224. In some implementations, a trigger message may not be sent to client device 224 while an alarm is in an active state and/or radio resources may not be assigned to client device 224.

In some implementations, PGW 210 and/or IWF 220 may determine whether the cached policy data structure includes client device information for client device 224 to which the trigger message is to be sent. If the policy data structure does not include client device information for client device 224, then PGW 210 and/or IWF 220 may determine not to reject the trigger message based on a stored policy (but not necessarily to send the trigger message to client device 224).

If the policy data structure includes client device information for client device 224, then PGW 210 and/or IWF 220 may determine a status of client device 224 based on the client device information. PGW 210 and/or IWF 220 may determine whether to reject the trigger message based on the status of client device 224. For example, if the status indicates radio resources should not be assigned to client device 224, the communication session should be terminated, and/or the communication session should be throttled, PGW 210 and/or IWF 220 may determine to reject the trigger message. On the other hand, if the status indicates no action should be taken, then PGW 210 and/or IWF 220 may determine not to reject the trigger message based on the status of client device 224 (but not necessarily to send the trigger message to client device 224).

In some implementations, if the cached policy data structure includes client device information for client device 224, then PGW 210 and/or IWF 220 may determine a policy associated with client device 224 based on the client device information and the local policy information. PGW 210 and/or IWF 220 may determine whether to reject the trigger message based on whether the trigger message will cause client device 224 to violate the policy. For example, PGW 210 and/or IWF 220 may detect how many trigger messages have been sent to client device 224, via a respective PGW 210 and/or IWF 220, in a particular amount of time and/or use deep packet inspection (DPI) to determine a security protocol to be used. If PGW 210 and/or IWF 220 do not detect that a threshold access limit is exceeded and/or a particular security protocol is to be used, then PGW 210 and/or IWF 220 may determine not to reject the trigger message based on the policy (but not necessarily to send the trigger message to client device 224).

In some implementations, the policy may throttle or prevent new communication sessions if the trigger message will cause client device 224 to exceed the threshold access limit. Thus, if sending the trigger message to client device 224 would cause client device 224 to exceed the threshold access limit, PGW 210 and/or IWF 220 may determine to reject the trigger message in accordance with the policy.

Additionally, or alternatively, the policy may restrict particular security protocols. Thus, if the trigger message indicates a particular security protocol will be used, PGW 210 and/or IWF 220 may determine to reject the trigger message in accordance with the policy. On the other hand, the policy may indicate that no action should be taken even if the threshold access limit is exceeded and/or the particular security protocol is used. Thus, PGW 210 and/or IWF 220 may determine not to reject the trigger message based on the policy (but not necessarily to send the trigger message to client device 224).

As further shown in FIG. 7A, if PGW 210 and/or IWF 220 determines that the trigger message should be rejected based on the cached policy data structure (block 704—yes), process 700 may include sending a notification to application server 226 (block 706). For example, PGW 210 and/or IWF 220 may send the notification to application server 226. The notification may be a message that notifies application server 226 that the trigger message will not be sent to client device 224. Additionally, or alternatively, the notification may indicate a policy that sending the trigger request to client device 224 would cause client device 224 to violate.

Application server 226 may receive the notification and take action to control how often trigger messages are sent to client device 224 and/or what security protocols are used.

In some implementations, PGW 210 and/or IWF 220 may send update information to service control server 214 indicating that application server 226 sent a trigger message for client device 224 and/or that the notification was sent to client device 224. Additionally, or alternatively, the update information may indicate a reason why the notification was sent to client device 224 (e.g., indicate a policy that was violated).

As further shown in FIG. 7A, if PGW 210 and/or IWF 220 determines that the trigger message should not be rejected based on the cached policy data structure (block 704—no), process 700 may include determining if an alarm condition is satisfied (block 708). For example, PGW 210 and/or IWF 220 may determine if an alarm condition is satisfied.

In some implementations, PGW 210 and/or IWF 220 may store alarm information indicating an alarm condition. The alarm condition may identify the threshold access limit and/or a different access limit that indicates how often any client device 224 may be assigned radio resources and/or access operator network 202. For example the alarm condition may be satisfied if a rate at which trigger messages are received exceeds the threshold access limit and/or the different access limit. Additionally, or alternatively, the policy rule may restrict a kind of data security and/or a kind of data transmission. For example, the alarm condition may be satisfied by using transport layer security (TLS), a secure sockets layer (SSL) protocol, a virtual private network (VPN), etc.

In some implementations, PGW 210 and/or IWF 220 may determine if all trigger messages satisfy an alarm condition. In some implementations, PGW 210 and/or IWF 220 may determine if a trigger message satisfies an alarm condition only when the cached policy data structure does not store a policy for the client device 224 to which the trigger message is to be sent. In some implementations, PGW 210 and/or IWF 220 may determine if a trigger message satisfies an alarm condition only when the trigger message was not rejected based on the cached policy data structure. In some implementations, PGW 210 and/or IWF 220 may determine if an alarm condition is satisfied before, simultaneously with, or after PGW 210 and/or IWF 220 determines whether to reject the trigger message based on the cached policy data structure.

As further shown in FIG. 7A, if PGW 210 and/or IWF 220 determine that the alarm condition is not satisfied (block 708—no), process 700 may include causing the trigger message to be sent to client device 224 (block 710). For example, PGW 210 and/or IWF 220 may cause the trigger message to be sent to client device 224 via operator network 202 by causing radio resources to be assigned to client device 224. Client device 224 may receive the trigger message.

In some implementations, PGW 210 and/or IWF 220 may send information to service control server 214 indicating that client device 224 was sent the trigger message.

As further shown in FIG. 7A, if PGW 210 and/or IWF 220 determine that the alarm condition is satisfied (block 708—yes), process 700 may include sending an alarm message to service control server 214 (block 712). For example, PGW 210 and/or IWF 220 may send the alarm message to service control server 214 based on the alarm condition being satisfied. The alarm message may indicate the alarm condition that was satisfied and the client device identifier for client device 224. For example, the alarm message may indicate the trigger message will cause a threshold access rate to be exceeded and/or a security protocol to be used to communicate with client device 224. In some implementations, PGW 210 and/or IWF 220 may update an alarm state indicated by the client device information to indicate the alarm state is active. While the alarm state is active, PGW 210 and/or IWF 220 may not permit the trigger message to be sent to client device 224.

Service control server 214 may receive the alarm message from PGW 210 and/or IWF 220.

As further shown in FIG. 7A, process 700 may include sending a subscription query to HSS/AAA server 212 (block 714). For example, service control server 214 may send the subscription query to HSS/AAA server 212 based on receiving the alarm message. The subscription query may include the client device identifier for client device 224 and request device type information about client device 224. The device type information may indicate whether client device 224 is a M2M device.

HSS/AAA server 212 may receive the subscription query from control server 214. HSS/AAA server 212 may store subscription information for client devices 224 registered with operator network 202. HSS/AAA server 212 may query the subscription information using the client device identifier included in the subscription query and obtain device type information for client device 224.

As further shown in FIG. 7A, process 700 may include sending a subscription response to service control server 214 (block 716). For example, HSS/AAA server 212 may send the subscription response to service control server 214. The subscription response may include the obtained device type information and indicate a device type of client device 224.

Control server 214 may receive the subscription response sent by HSS/AAA server 212.

As further shown in FIG. 7A, process 700 may include determining whether client device 224 is a M2M device based on the subscription response (block 718). For example, service control server 214 may determine whether client device 224 is a M2M device.

In some implementations, service control server 214 may determine client device 224 is a M2M device if the device type information included in the subscription response indicates client device 224 is a M2M device. On the other hand, service control server 214 may determine client device 224 is not a M2M device if the device type information included in the subscription response indicates client device 224 is not a M2M device.

As further shown in FIG. 7A, if service control server 214 determines client device 224 is not a M2M device (block 718—no), process 700 may include sending a cancel alarm message to PGW 210 and/or IWF 220 (block 720). For example, service control server 214 may send the cancel alarm message. The cancel alarm message may indicate to set an alarm state for client device 224 to deactive.

PGW 210 and/or IWF 220 may receive the cancel alarm message and set the alarm state to deactive for client device 224.

In some implementations, the cancel alarm message may include M2M information indicating that client device 224 is not a M2M device. PGW 210 and/or IWF 220 may store the M2M information indicating client device 224 is not a M2M device. Accordingly, PGW 210 and/or IWF 220 may not send alarm messages in response to trigger messages being sent to client device 224 in the future based on client device 224 not being a M2M device.

As further shown in FIG. 7A, process 700 may include causing the trigger message to be sent to client device 224 via operator network 202 (block 722). For example, PGW 210 and/or IWF 220 may cause the trigger message to be sent to client device 224 via operator network 202 by causing radio resources to be assigned to client device 224. Client device 224 may receive the trigger message.

As further shown in FIG. 7A, if service control server 214 determines client device 224 is a M2M device (block 718—yes), process 700 may include sending a policy query to PCRF 216 (block 724). For example, service control server 214 may send the policy query to PCRF 216 based on client device 224 being a M2M device. The policy query may include the client device identifier for client device 224 and request a policy associated with client device 224.

PCRF 216 may receive the policy query from service control server 214. PCRF 216 may store policy information for client devices 224 registered with operator network 202. PCRF 216 may query the policy information using the client device identifier included in the subscription query and obtain policy information for client device 224.

As further shown in FIG. 7A, process 700 may include sending a policy response to service control server 214 (block 726). For example, PCRF 216 may send the policy response to service control server 214. The policy response may include the obtained policy information for client device 224 and indicate a policy for client device 224.

Service control server 214 may receive the policy response sent by PCRF 216.

As further shown in FIG. 7A, process 700 may include service control server 214 determining whether to cancel the alarm based on the policy for client device 224 (block 728). For example, service control server 214 may determine whether to cancel the alarm based on the policy obtained from PCRF 216, a RRC request received by one or more base stations 204, an alarm condition satisfied by client device 224 at one or more base stations 204 and/or MMEs 208, a trigger message received from application server 226 by one or more PGWs 210 and/or IWFs 220, and/or an alarm condition satisfied for client device 224 at one or more PGWs 210 and/or IWFs.

In some implementations, the policy obtained from PCRF 216 may include a policy rule that limits an access rate to a permitted access rate. Accordingly, service control server 214 may determine whether client device 224 complies with the policy based on how many RRC requests have been received from client device 224, at one or more base stations 204 and/or MMEs 208, in a particular amount of time, and/or how many trigger messages have been received from application server 226, by one or more PGWs 210 and/or IWFs 220, in the particular amount of time. For example, service control server 214 may add together all the RRC requests received from client device 224 and all the trigger messages sent to client device 224 to calculate a total number of messages in the particular amount of time. Service control server 214 may determine the total number of messages in the particular amount of time based on alarm messages and/or update information received from base stations 204, MMEs 208, PGWs 210, and/or IWFs 220.

In other words, while each base station 204, MME 208, PGW 210, and/or IWF 220 may determine whether an individual interaction with client device 224 and/or application server 226 violates a policy for client device 224, service control server 214 may determine whether the cumulative interactions between client device 224 and devices of operator network 202 violate the policy for client device 224.

If the total number of messages in the particular amount of time does not exceed the access limit permitted by the policy for client device 224, then service control server 214 may determine that client device 224 complies with the policy. Accordingly, service control server 214 may determine to cancel the alarm based on the access limit not being exceeded.

On the other hand, if the total number of messages in the particular amount of time exceeds an access limit permitted by a policy for client device 224, then service control server 214 may determine that client device 224 does not comply with the policy. Accordingly, service control server 214 may determine whether to cancel the alarm based on the policy action associated with violating the policy rule (e.g., exceeding the permitted access limit). For example, the policy action may indicate no action should be taken (e.g., the total number of messages in the particular amount of time is permitted). Accordingly, service control server 214 may determine to cancel the alarm. On the other hand, the policy action may indicate to reject the trigger message and/or not to assign radio resources to client device 224. Accordingly, service control server 214 may determine not to cancel the alarm and to reject the trigger message based on the policy action.

In some implementations, the policy obtained from PCRF 216 may include a policy rule that restricts the use of a particular security protocol. Accordingly, control server 214 may determine whether the trigger message would cause client device 224 to comply with the policy based on whether an alarm message indicates the particular security protocol is being used. If the particular security protocol is not being used, then control server 214 may determine that client device 224 complies with the policy and the alarm should be cancelled.

On the other hand, if the particular security protocol is being used, then control server 214 may determine that client device 224 does not comply with the policy. Accordingly, service control server 214 may determine whether to cancel the alarm based on the policy action associated with violating the policy rule (e.g., using the restricted security protocol). For example, the policy action may indicate no action should be taken (e.g., client device 224 is permitted to use the security protocol). Accordingly, service control server 214 may determine to cancel the alarm. On the other hand, the policy action may indicate to reject the trigger message and/or to not assign radio resources to client device 224. Accordingly, service control server 214 may determine not to cancel the alarm and to reject the trigger message based on the policy action.

As further shown in FIG. 7A, if service control server 214 determines to cancel the alarm (block 728—yes), process 700 may include sending a cancel alarm message to PGW 210 and/or IWF 220 (block 730). For example, service control server 214 may send the cancel alarm message to PGW 210 and/or IWF 220. The cancel alarm message may indicate to set an alarm state for client device 224 to deactive.

PGW 210 and/or IWF 220 may receive the cancel alarm message and set the alarm state to deactive for client device 224.

In some implementations, the cancel alarm message may include policy information indicating the policy for client device 224. PGW 210 and/or IWF 220 may use the policy information to update client device information included in the cached policy data structure to indicate the policy for client device 224.

As further shown in FIG. 7A, process 700 may include causing the trigger message to be sent to client device 224 via operator network 202 (block 732). For example, PGW 210 and/or IWF 220 may cause the trigger message to be sent to client device 224 via operator network 202 by causing radio resources to be assigned to client device 224. Client device 224 may receive the trigger message.

As further shown in FIG. 7A, if service control server 214 determines not to cancel the alarm (block 728—no), process 700 may include sending a rejection instruction to PGW 210 and/or IWF 220 (block 734). For example, service control server 214 may send the rejection instruction. The rejection instruction may indicate to reject the trigger message from application server 226 and to send a notification to application server 226.

In some implementations, the rejection instruction may include policy information indicating the policy for client device 224. PGW 210 and/or IWF 220 may use the policy information to update client device information included in the cached policy data structure to indicate the policy for client device 224.

As further shown in FIG. 7A, process 700 may include sending a notification to application server 226 (block 736). For example, PGW 210 and/or IWF 220 may send the notification to application server 226. The notification may be a message that notifies application server 226 that the trigger message will not be sent to client device 224. Additionally, or alternatively, the notification may indicate a policy that sending the trigger request to client device 224 would cause client device 224 to violate.

Application server 226 may receive the notification and take action to control how often trigger messages are sent to client device 224 and/or what security protocols are used.

As shown in FIG. 7B, process 700 may include sending update information to base station 204 and/or MME 208 (block 738). For example, service control server 214 may send update information to base station 204 and/or MME 208 to update the cached policy data structure.

For instance, the local policy information may be updated to reflect new or changed policies. Additionally, or alternatively, the client device information may be updated to reflect new or changed polices for client device 224 as indicated by PCRF 216. For example, the update information may indicate a new policy identifier associated with client device 224. Moreover, the client device information may be updated to reflect a new status associated with client device 224 and/or a new alarm state (e.g., active or deactive). For example, if any device in operator network 202 detects that client device 224 violated a policy, the status may be updated at other devices in operator network 202 to reflect the current status of client device 224.

Base station 204 and/or MME 208 may receive the update information sent from service control server 214.

As further shown in FIG. 7B, process 700 may include updating the cached policy data structure (block 740). For example, base station 204 and/or MME 208 may update the cached policy data structure based on the update information. Thus, base station 204 and/or MME 208 may be able to accurately determine to accept or reject a future RRC request using the cached policy data structure without service control server 214 having to determine to accept or reject the future RRC request.

As further shown in FIG. 7B, process 700 may include sending update information to PGW 210 and/or IWF 220 (block 742). For example, service control server 214 may send update information to PGW 210 and/or IWF 220 to update the cached policy data structure.

For instance, the local policy information may be updated to reflect new or changed policies. Additionally, or alternatively, the client device information may be updated to reflect new or changed polices for client device 224 as indicated by PCRF 216. For example, the update information may indicate a new policy identifier associated with client device 224. Moreover, the client device information may be updated to reflect a new status associated with client device 224 and/or a new alarm state (e.g., active or deactive). For example, if any device in operator network 202 detects that client device 224 violated a policy, the status may be updated at other devices in operator network 202 to reflect the current status of client device 224.

PGW 210 and/or IWF 220 may receive the update information sent from service control server 214.

As further shown in FIG. 7B, process 700 may include updating the cached policy data structure (block 744). For example, PGW 210 and/or IWF 220 may update the cached policy data structure based on the update information. Thus, PGW 210 and/or IWF 220 may be able to accurately determine to accept or reject a trigger message from application server 226 using the cached policy data structure without service control server 214 having to determine to accept or reject the trigger message.

Although FIGS. 7A and 7B show example blocks of process 700, in some implementations, process 700 may include additional blocks, fewer blocks, different blocks, or differently arranged blocks than those depicted in FIGS. 7A and 7B Additionally, or alternatively, two or more of the blocks of process 700 may be performed in parallel.

Figure 8A:
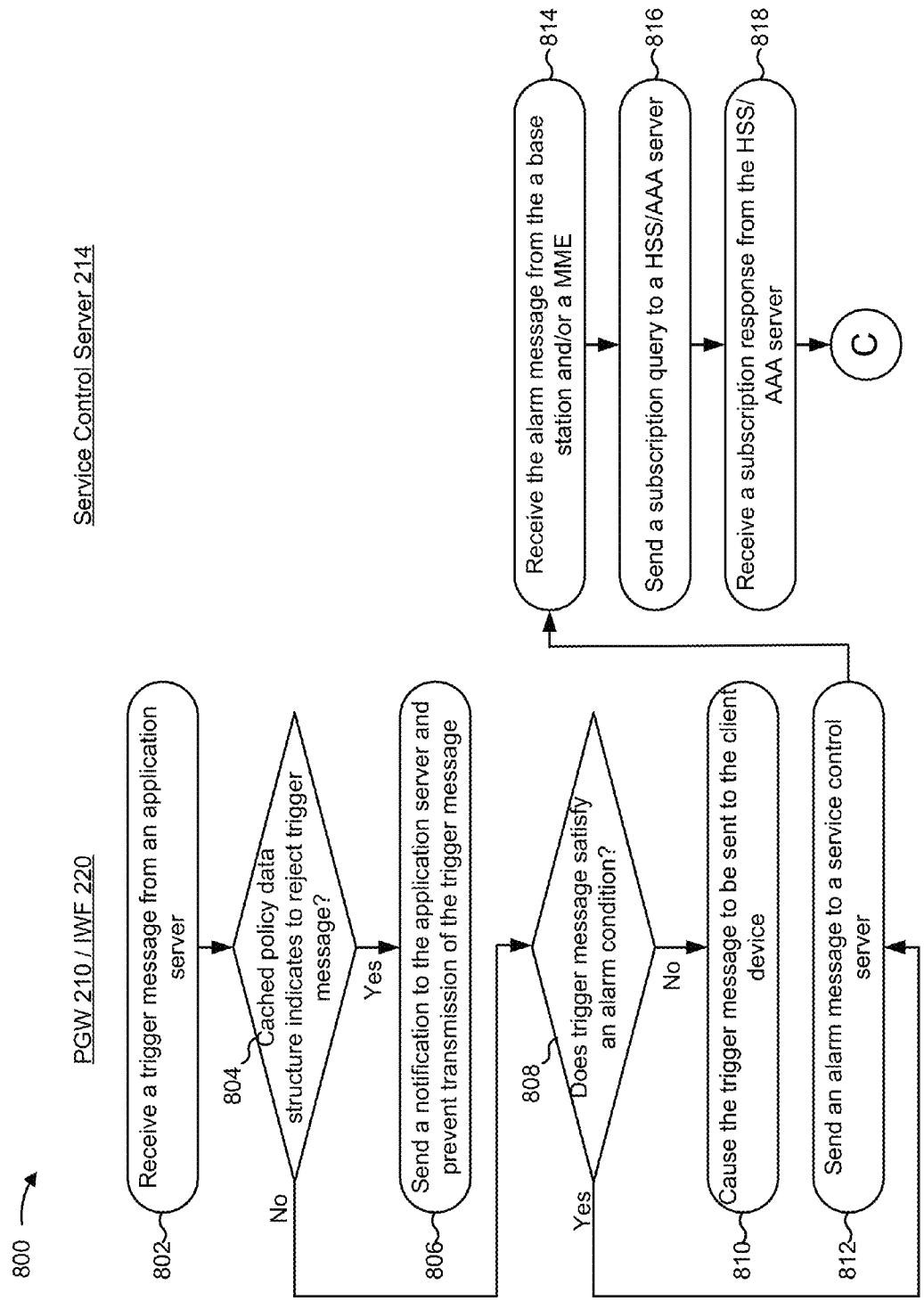
FIGS. 8A-8C are flowcharts of an example process relating to the call flow diagrams shown in FIGS. 7A and 7B.
Figure 8B:
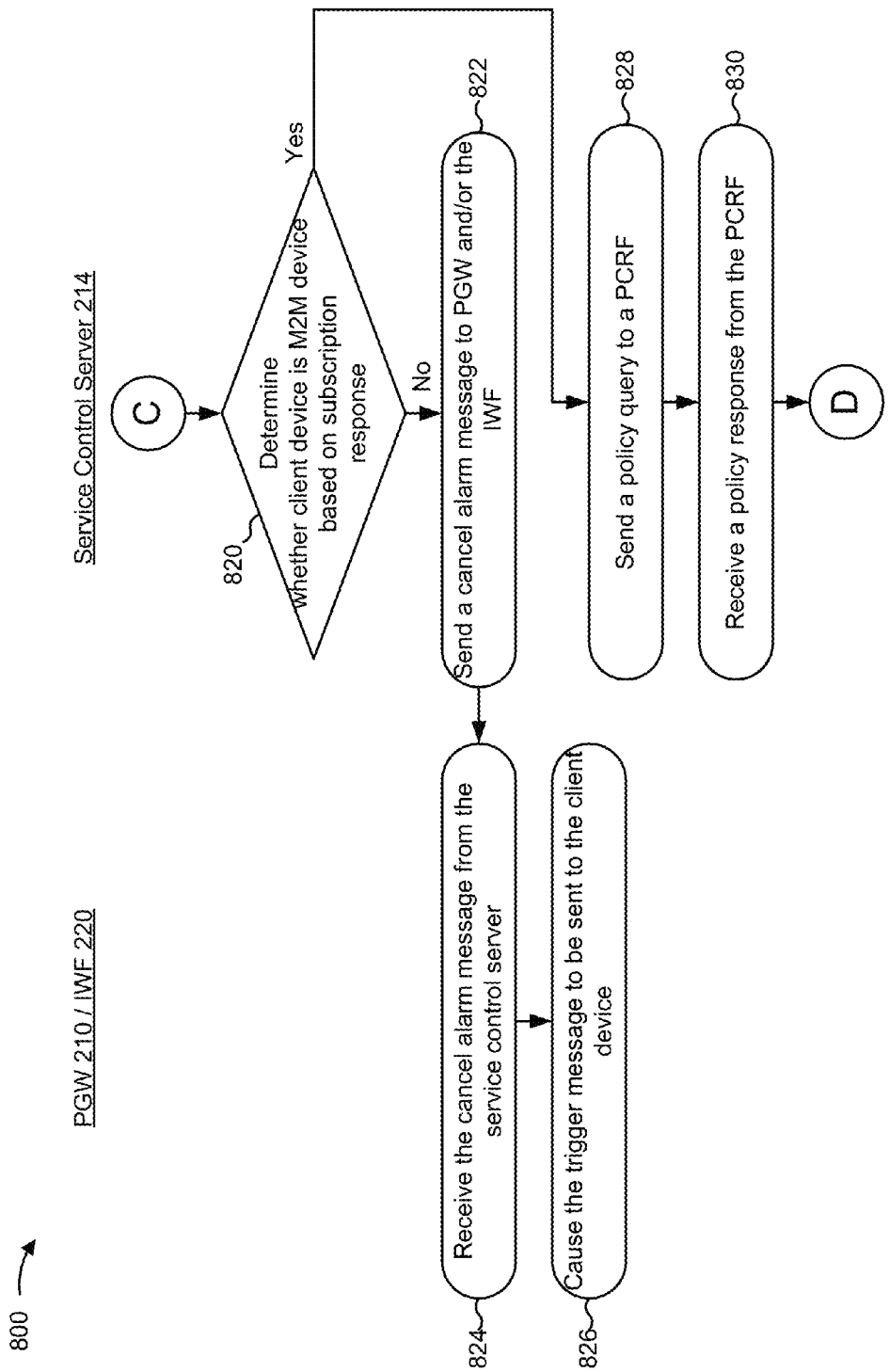
Figure 8C:
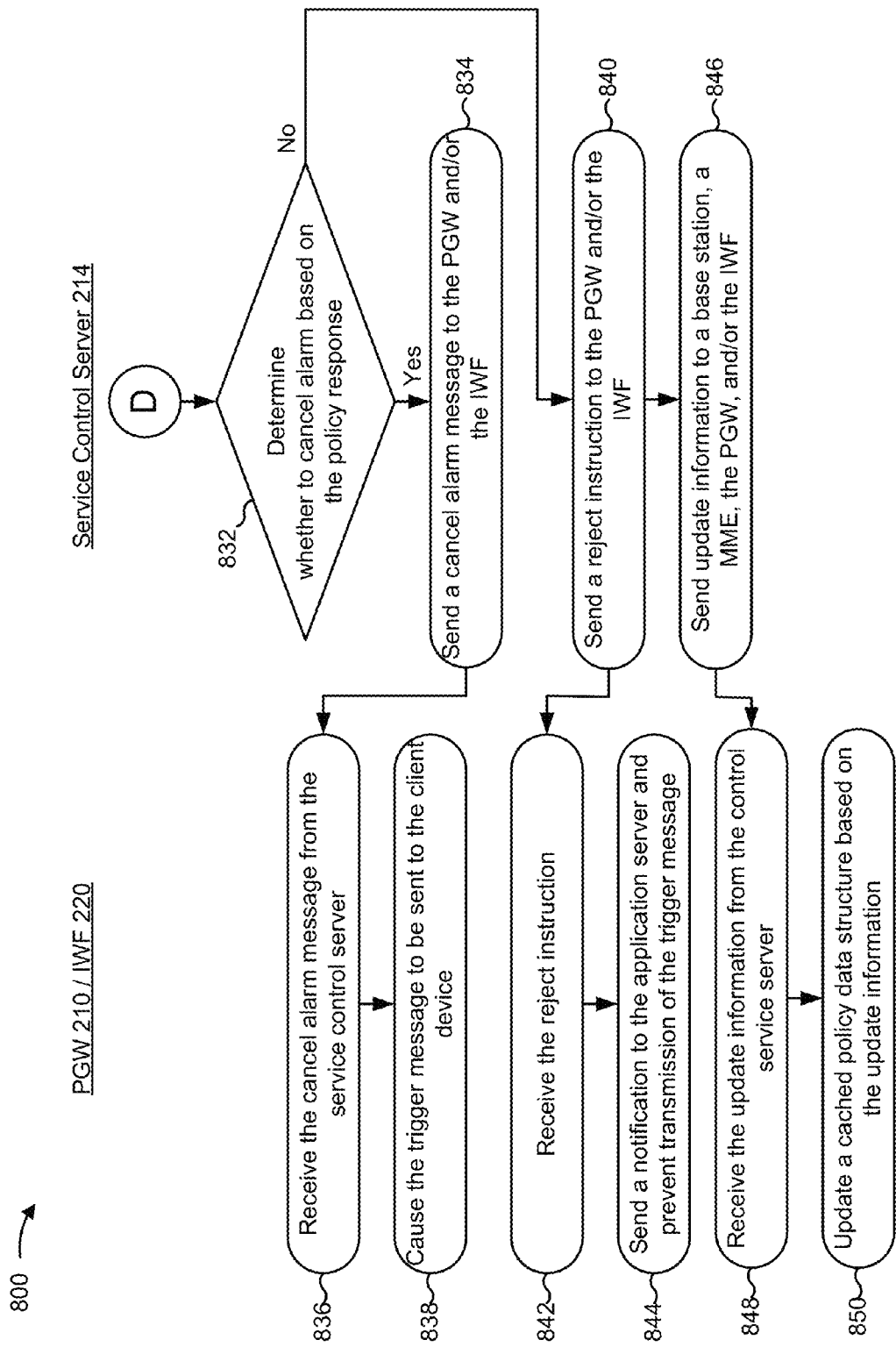

FIGS. 8A-8C are flowcharts of an example process 800 relating to the call flow diagrams shown in FIGS. 7A and 7B. In some implementations, one or more process blocks of FIGS. 8A-8C may be performed by PGW 210, IWF 220, and/or service control server 214. In some implementations, one or more process blocks of FIGS. 8A-8C may be performed by another device or a group of devices separate from or including PGW 210, IWF 220, and/or service control server 214, such as base station 204, MME 208, HSS/AAA server 212, PCRF 216, SCS 218, cache memory 222, client device 224, and/or application server 226.

As shown in FIG. 8A, process 800 may include receiving a trigger message from application server 226 (block 802). For example, PGW 210 and/or IWF 220 may receive the trigger message as discussed with respect to block 702 in FIG. 7A.

As further shown in FIG. 8A, process 800 may include determining whether a cached policy data structure indicates to reject the trigger message (block 804). For example, PGW 210 and/or IWF 220 may determine whether the cached policy data structure indicates to reject the trigger message as discussed with respect to block 704 in FIG. 7A.

As further shown in FIG. 8A, if the cached policy data structure indicates to reject the trigger message (block 804—yes), process 800 may include sending a notification to application server 226 (block 806). For example, PGW 210 and/or IWF 220 may send the notification as discussed with respect to block 706 in FIG. 7A.

As further shown in FIG. 8A, if the cached policy data structure indicates not to reject the trigger message (block 804—no), process 800 may include determining whether the trigger message causes client device 224 to satisfy an alarm condition (block 808). For example, PGW 210 and/or IWF 220 may determine whether the trigger message causes client device 224 to satisfy an alarm condition as discussed with respect to block 708 in FIG. 7A.

As further shown in FIG. 8A, if the trigger message does not cause client device 224 to satisfy an alarm condition (block 808—no), process 800 may include causing the trigger message to be sent to client device 224 (block 810). For example, PGW 210 and/or IWF 220 may cause the trigger message to be sent to client device 224 as discussed with respect to block 710 in FIG. 7A.

As further shown in FIG. 8A, if the trigger message does cause client device 224 to satisfy an alarm condition (block 808—yes), process 800 may include sending an alarm message to service control server 514 (block 812). For example, PGW 210 and/or IWF 220 may send the alarm message as discussed with respect to block 712 in FIG. 7A.

As further shown in FIG. 8A, process 800 may include receiving the alarm message from PGW 210 and/or IWF 220 (block 814). For example, service control server 214 may receive the alarm message as discussed with respect to block 712 in FIG. 7A.

As further shown in FIG. 8A, process 800 may include sending a subscription query to HSS/AAA server 212 (block 816). For example, service control server 214 may send the subscription query as discussed with respect to block 714 in FIG. 7A.

As further shown in FIG. 8A, process 800 may include receiving a subscription response from HSS/AAA server 212 (block 818). For example, service control server 214 may receive the subscription query as discussed with respect to block 716 in FIG. 7A.

As shown in FIG. 8B, process 800 may include determining whether client device 224 is a M2M device based on the subscription response (block 820). For example, service control server 214 may determine whether client device 224 is a M2M device as discussed with respect to block 718 in FIG. 7A.

As further shown in FIG. 8B, if client device 224 is determined not to be a M2M device (block 820—no), process 800 may include sending a cancel alarm message to PGW 210 and/or IWF 220 (block 822). For example, service control server 214 may send the cancel alarm message as discussed with respect to block 720 in FIG. 7A.

As further shown in FIG. 8B, process 800 may include receiving the cancel alarm message from service control server 214 (block 824). For example, PGW 210 and/or IWF 220 may receive the cancel alarm message as discussed with respect to block 720 in FIG. 7A.

As further shown in FIG. 8B, process 800 may include causing the trigger message to be sent to client device 224 (block 826). For example, PGW 210 and/or IWF 220 may cause the trigger message to be sent to client device 224 as discussed with respect to block 722 in FIG. 7A.

As further shown in FIG. 8B, if client device 224 is determined to be a M2M device (block 820—yes), process 800 may include sending a policy query to PCRF 216 (block 828). For example, service control server 214 may send a policy query as discussed with respect to block 724 in FIG. 7A.

As further shown in FIG. 8B, process 800 may include receiving a policy response from PCRF 216 (block 830). For example, service control server 214 may receive the policy response as discussed with respect to block 726 in FIG. 7A.

As shown in FIG. 8C, process 800 may include determining whether to cancel the alarm based on the policy response (block 832). For example, service control server 214 may determine whether to cancel the alarm based on the policy response as discussed with respect to block 728 in FIG. 7A.

As further shown in FIG. 8C, if the trigger message causes client device 224 to comply with the policy (block 832—yes), process 800 may include sending a cancel alarm message to PGW 210 and/or IWF 220 (block 834). For example, service control server 214 may send the cancel alarm message as discussed with respect to block 730 in FIG. 7A.

As further shown in FIG. 8C, process 800 may include receiving the cancel alarm message from service control server 214 (block 836). For example, PGW 210 and/or IWF 220 may receive the cancel alarm message as discussed with respect to block 730 in FIG. 7A.

As further shown in FIG. 8C, process 800 may include causing the trigger message to be sent to client device 224 (block 838). For example, PGW 210 and/or IWF 220 may cause the trigger message to be sent to client device 224 as discussed with respect to block 732 in FIG. 7A.

As further shown in FIG. 8C, if the trigger message causes client device 224 to not comply with the policy (block 832—no), process 800 may include sending a reject instruction to PGW 210 and/or IWF 220 (block 840). For example, service control server 214 may send the reject instruction as discussed with respect to block 734 in FIG. 7A.

As further shown in FIG. 8C, process 800 may include receiving the reject instruction from service control server 214 (block 842). For example, PGW 210 and/or IWF 220 may receive the reject instruction as discussed with respect to block 734 in FIG. 7A.

As further shown in FIG. 8C, process 800 may include sending a notification to application server 226 and preventing transmission of the trigger message (block 844). For example, PGW 210 and/or IWF 220 may send the notification as discussed with respect to block 736 in FIG. 7A.

As further shown in FIG. 8C, process 800 may include sending update information to base station 204, MME 208, PGW 210, and/or IWF 220 (block 846). For example, service control server 214 may send update information as discussed with respect to blocks 738 and 742 in FIG. 7B.

As further shown in FIG. 8C, process 800 may include receiving the update information from service control server 214 (block 848). For example, PGW 210 and/or IWF 220 may receive the update information as discussed with respect to block 742 in FIG. 7B.

As further shown in FIG. 8C, process 800 may include updating the cached policy data structure based on the update information (block 850). For example, PGW 210 and/or IWF 220 may update the cached policy data structure as discussed with respect to block 744 in FIG. 7B.

Although FIGS. 8A-8C show example blocks of process 800, in some implementations, process 800 may include additional blocks, fewer blocks, different blocks, or differently arranged blocks than those depicted in FIGS. 8A-8C. Additionally, or alternatively, two or more of the blocks of process 800 may be performed in parallel.

Figure 9A:
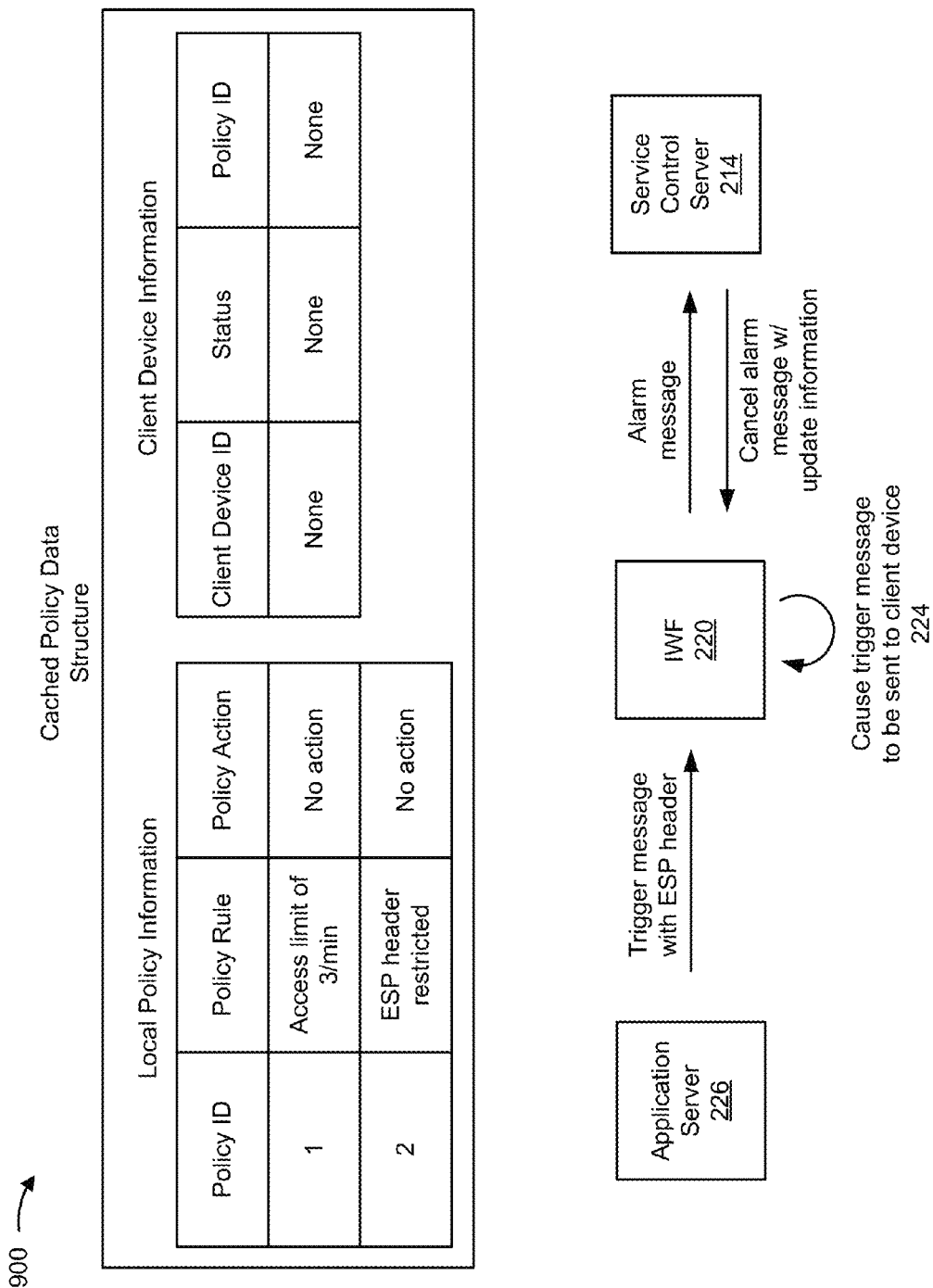
FIGS. 9A and 9B are diagrams of an example implementation relating to the example processes shown in FIGS. 7A-8C.
Figure 9B:
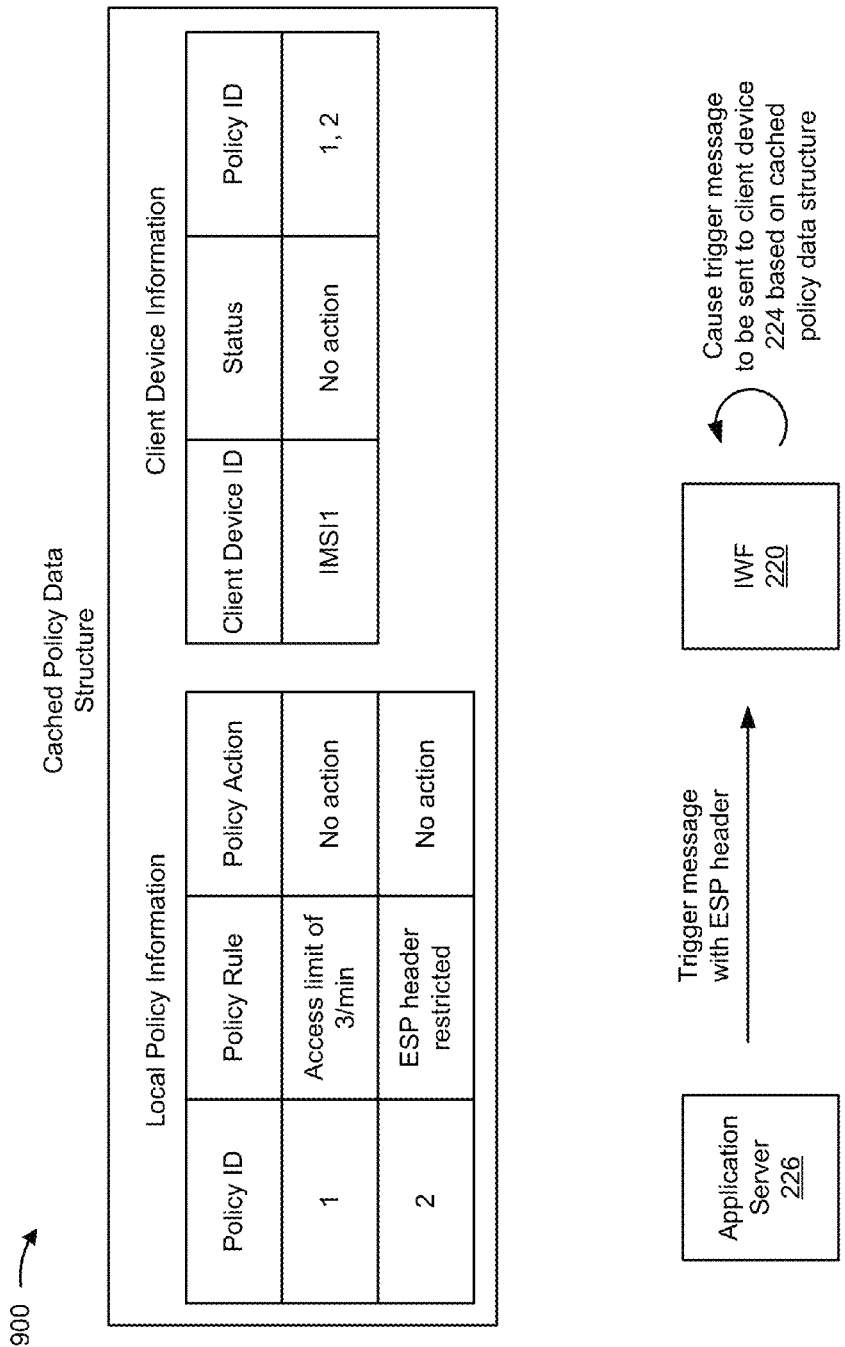

FIGS. 9A and 9B are diagrams of an example implementation 900 relating to example processes 700 and 800 shown in FIGS. 7A-8C. FIGS. 9A and 9B show an example of controlling access of application server 226 to client device 224 via operator network 202.

In example implementation 900, assume IWF 220 stores, in cache memory 222, a cached policy data structure as illustrated in FIG. 9A. For example, the cached policy data structure may include local policy information and client device information. Assume the local policy information indicates a first policy, having a policy identifier 1, takes no action when a threshold access limit of three access per minute is exceeded. Further, assume the local policy information indicates a second policy, having a policy identifier 2, which takes no action when a message includes ESP header. Further, assume the client device information does not include any information at this time. In other words, assume the cached policy data structure does not indicate a policy for client device 224.

Also, assume IWF 220 stores alarm information indicating an alarm condition that is satisfied when client device 224 accesses operator network 202 more than three times within a minute and/or a message for client device 224 includes an ESP header.

As shown in FIG. 9A, assume that application server 226 sends a trigger message to IWF 220 to be sent to client device 224. IWF 220 may receive the trigger message and determine that the trigger message triggers an alarm based on violating an alarm condition by including an ESP header. IWF 220 may send an alarm message to service control server 214. The alarm message may indicate a client device identifier (e.g., IMSI1) for client device 224 and indicate that a trigger message with an ESP header is to be sent to client device 224.

Service control server 214 may receive the alarm message and obtain policy information for client device 224 based on the client device identifier. Assume the policy information indicates that policy 1 and policy 2 are associated with client device 224. Accordingly, service control server 214 may determine that client device 224 is permitted to send and/or receive a message with an ESP header based on policy 2 indicating no action should be taken. Service control server 214 may send a cancel alarm message and update information to IWF 220.

IWF 220 may receive the cancel alarm message and the update information. IWF 220 may cancel the alarm and cause the trigger message to be sent to client device 224. Furthermore, IWF 220 may update the client device information included in the cached policy data structure based on the update information.

As shown in FIG. 9B, IWF 220 may update the client device information to include an entry for client device 224 having IMSI1. The client device information may associate policy 1 and policy 2 with client device 224 and indicate that a status for client device 224 is that no action should be taken.

As further shown in FIG. 9B, client device 224 may send another trigger message, with an ESP header, meant for client device 224 to IWF 220. IWF 220 may receive the trigger message and determine client device 224 is complying with policy 2 based on the cached policy data structure. Accordingly, IWF 220 may cause the trigger message to be sent to client device 224 without consulting service control server 214.

In this way, application server 226's access to client device 224 via operator network 202 may be controlled based on policies associated with client device 224.

As indicated above, FIGS. 9A and 9B are provided merely as an example. Other examples are possible and may differ from what was described with regard to FIGS. 9A and 9B.

Implementations described herein may determine whether a M2M device complies with policies for the M2M device and control access of the M2M device to an operator network in real time. Furthermore, implementations described herein may detect violations of the policies due to a message being sent from a M2M device and/or to a M2M device from an application server.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, operatively connected to the memory, to:
  receive an alarm message from a particular device that received a radio resource control request from a client device,
    the alarm message being provided by the particular device based on the particular device detecting a first alarm condition corresponding to the client device, and
    the first alarm condition indicating that the client device has satisfied a first threshold access limit to an operator network,
      the first threshold access limit identifying a first quantity of radio resource control requests that the client device is permitted to send per an amount of time, and
    the first alarm condition being different from a second alarm condition that corresponds to another client device capable of providing a radio resource control request to the particular device;
  determine, in response to receiving the alarm message, that the client device is a machine-to-machine (M2M) device;
  apply, based on determining that the client device is a M2M device, a first policy rule corresponding to the client device,
    the first policy rule identifying
      a second threshold access limit that identifies a second quantity of radio resource control requests that the client device is permitted to send per an amount of time,
      the second threshold access limit being different from the first threshold access limit, and the first policy rule being different from a second policy rule that corresponds to the other client device;
determine that the first policy rule is violated based on the alarm message received from the particular device; and
instruct the particular device to reject the radio resource control request based on the first policy rule being violated.

2. The device of claim 1, where the one or more processors are further to:
send update information to the particular device that indicates the first policy rule for the client device to permit the particular device to process a future radio resource control request from the client device.

3. The device of claim 1, where the particular device is a first base station included in the operator network, and where the one or more processors are further to:
send update information, which indicates a policy action, associated with the first policy rule, for the client device, to a second base station included in the operator network, based on the alarm message from the first base station.

4. The device of claim 1, where the particular device is a base station included in the operator network, and where the one or more processors are further to:
send update information, to a gateway device included in the operator network, that indicates a policy action, associated with the first policy rule, for the client device,
the update information permitting the gateway device to update a cached policy data structure.

5. The device of claim 1, where the one or more processors are further to:
determine the client device is included in a device class defined by the operator network; and
where the one or more processors, when determining the first policy rule is violated, are to:
determine the first policy rule is violated based on the client device being included in the device class.

6. The device of claim 1, where the one or more processors are further to:
send a request to a server,
the request including a client device identifier that identifies the client device;
receive a response from the server based on the request, the response indicating the client device is the machine-to-machine device; and
where the one or more processors, when determining that the client device is a M2M device, are to:
determine the client device is included in a M2M device based on the response.

7. The device of claim 1, where a policy action, associated with the first policy rule is used to limit how often the client device is assigned a radio resource in the operator network.

8. The device of claim 1, where the one or more processors, when determining the first policy rule is violated, are to:
determine the first policy rule is violated based on a message from another device that indicates the client device accessed the operator network via the other device.

9. The device of claim 1, where the alarm message is a first alarm message, and the one or more processors are further to:
receive a second alarm message from a gateway device, included in the operator network, that received a message from a server to be sent to the client device via the operator network,
the second alarm message indicating that the second threshold access limit to the operator network is satisfied by the client device;
determine the first policy rule is violated based on the second alarm message received from the gateway device; and
instruct the gateway device to prevent the message from being sent to the client device, based on the first policy rule being violated.

10. The device of claim 9, where the one or more processors are further to:
send update information to a base station included in the operator network based on the second alarm message,
the update information permitting the base station to update a cached policy data structure.

11. The device of claim 1, where the one or more processors are further to:
send a notification to an application server that manages the client device,
the notification indicating that the client device violated the first policy rule.

12. A non-transitory computer-readable medium storing instructions, the instructions comprising:
one or more instructions that, when executed by one or more processors, cause the one or more processors to:
store a policy data structure indicating a first policy rule, corresponding to a first client device, that indicates a first policy action to be taken if the first, policy rule is violated by the first client device,
the first policy rule indicating a threshold access limit corresponding to the first client device,
the threshold access limit identifying an amount of radio resources that the first client device is permitted to be assigned per an amount of time, and
the first policy rule being different from a second policy rule that corresponds to a second client device;
receive a first radio resource control request from the first client device;
determine whether the first client device violates the first policy rule indicated by the policy data structure;
execute the first policy action when the first client device violates the first policy rule; and
receive a second radio resource control request from the second client device;
determine whether the second client device violates the second policy rule;
execute a second policy action, identified by the second policy rule, when the second client device violates the second policy rule; and
selectively assign radio resources to the first client device or the second client device based on executing the first policy action and the second policy action.

13. The non-transitory computer-readable medium of claim 12, where the first policy action includes at least one of:
limiting how often the first client device is assigned radio resources, or
releasing a communication session with the first client device.

14. The non-transitory computer-readable medium of claim 12, where the one or more instructions further cause the one or more processors to:

store alarm information indicating an alarm condition,
the alarm condition being satisfied when at least one of an alarm access limit to an operator network is satisfied or an alarm protocol is used by the first client device;
determine the alarm condition is satisfied;
send an alarm message to a server based on the alarm condition being satisfied;
receive an instruction from the server based on the alarm message,
the instruction indicating whether to assign the radio resources to the first client device; and
selectively assign the radio resources to the first client device based on the instruction.

15. The non-transitory computer-readable medium of claim 14, where the one or more instructions further cause the one or more processors to:
receive update information from the server based on the alarm message,
the update information indicating an update to the policy data structure associated with the first client device; and
update the policy data structure based on the update information.

16. A method, comprising:
storing, by a gateway device in an operator network, a policy data structure that indicates a first policy rule, corresponding to a first client device, that indicates a first policy action to be taken if the first policy rule is violated,
the first policy rule indicating a threshold access limit corresponding to the first client device,
the threshold access limit identifying an amount of radio resources permitted to be assigned to the first client device per an amount of time, and
the first policy rule being different from a second policy rule that corresponds to a second client device;
receiving, by the gateway device, a first message from an application server to be sent to the first client device;
determining, by the gateway device, whether the first message causes the first client device to violate the first policy rule indicated by the policy data structure;
executing, by the gateway device, the first policy action when the first message causes the first client device to violate the first policy rule;
receiving, by the gateway device, a second message from an application server to be sent to the second client device;
determining, by the gateway device, whether the second message causes the second client device to violate the second policy rule;
executing, by the gateway device, a second policy action when the second message causes the second client device to violate the second policy rule; and
selectively causing, by the gateway device, the first message to be sent to the first client device via the operator network based on executing the first policy action, and causing the second message to be sent to the second client device via the operator network based on executing the second policy action.

17. The method of claim 16, where the first policy action includes at least one of limiting how often the first client device accesses the operator network or releasing a communication session with the first client device.

18. The method of claim 16, further comprising:
storing alarm information indicating an alarm condition,
the alarm condition being satisfied when at least one of an alarm access limit to the operator network is satisfied or an alarm protocol is used by the first message;
determining the alarm condition is satisfied;
sending an alarm message to a server based on the alarm condition being satisfied;
receiving an instruction from the server based on the alarm message;
the instruction indicating whether to cause the first message to be sent to the first client device; and
selectively causing the first message to be sent to the first client device based on the instruction.

19. The method of claim 18, further comprising: receiving update information from the server based on the alarm message,
the update information indicating an update to the policy data structure associated with the first client device; and
updating the policy data structure based on the update information.

20. The device of claim 1, where the one or more processors are further to:
send, to an application server associated with the client device, a notification indicating that the client device is non-compliant with the first policy rule,
the notification causing the application server to send a control message to the client device.

* * * * *